United States Patent [19]

Segarra

[11] 4,456,994
[45] Jun. 26, 1984

[54] REMOTE SIMULATION BY REMOTE CONTROL FROM A COMPUTER DESK

[75] Inventor: Gérard Segarra, Roissy-en-Brie, France

[73] Assignee: U.S. Philips Corporation, New York, N.Y.

[21] Appl. No.: 329,377

[22] Filed: Dec. 10, 1981

Related U.S. Application Data

[63] Continuation of Ser. No. 114,861, Jan. 24, 1980, abandoned.

[30] Foreign Application Priority Data

Jan. 31, 1979 [FR] France .................. 79 02524

[51] Int. Cl.³ .................................. G06F 11/22
[52] U.S. Cl. ........................... 371/16; 364/200
[58] Field of Search .................. 371/16, 17, 18; 364/200

[56] References Cited

U.S. PATENT DOCUMENTS

| | | | |
|---|---|---|---|
| 3,818,199 | 6/1974 | Grossmann et al. ......... | 371/16 X |
| 3,879,712 | 4/1975 | Edge et al. ................ | 371/16 X |
| 3,898,621 | 8/1975 | Zelinski et al. ............ | 364/200 |
| 3,932,843 | 1/1976 | Trelut et al. ............... | 364/200 |

OTHER PUBLICATIONS

Helfer, "Structure of Performance Monitor for Distributed Computer System", *IBM Tech. Disclosure Bulletin,* vol. 20, No. 11B, Apr. 1978, pp. 5060-5065.

*Primary Examiner*—David H. Malzahn
*Attorney, Agent, or Firm*—Thomas A. Briody; Jack E. Haken; James J. Cannon, Jr.

[57] ABSTRACT

A data processing system, comprising several distributed processing units which are connected to a remote central monitor and test station in which the state of each distributed processing unit is monitored by the transmission of test and diagnostic signals. Each processing unit comprises a simulation unit which comprises a microprocessor and test sequences for decoding and simulating these commands and, after their execution by the central unit of the processing unit, for transmitting the results to the central station for analysis. Moreover, the simulation unit is capable of detecting errors in the simulation and the execution of the commands and of supplying the central station with a warning.

17 Claims, 30 Drawing Figures

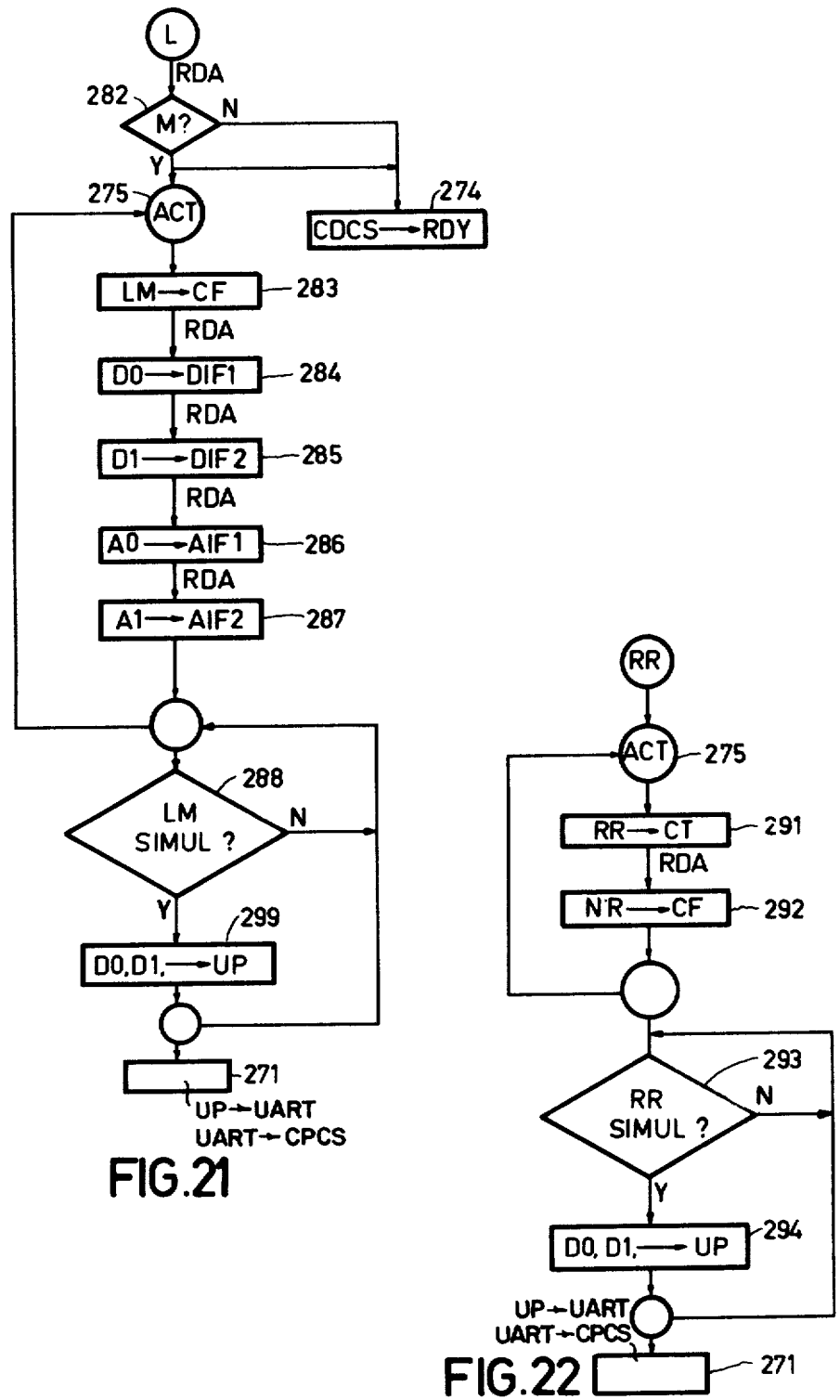

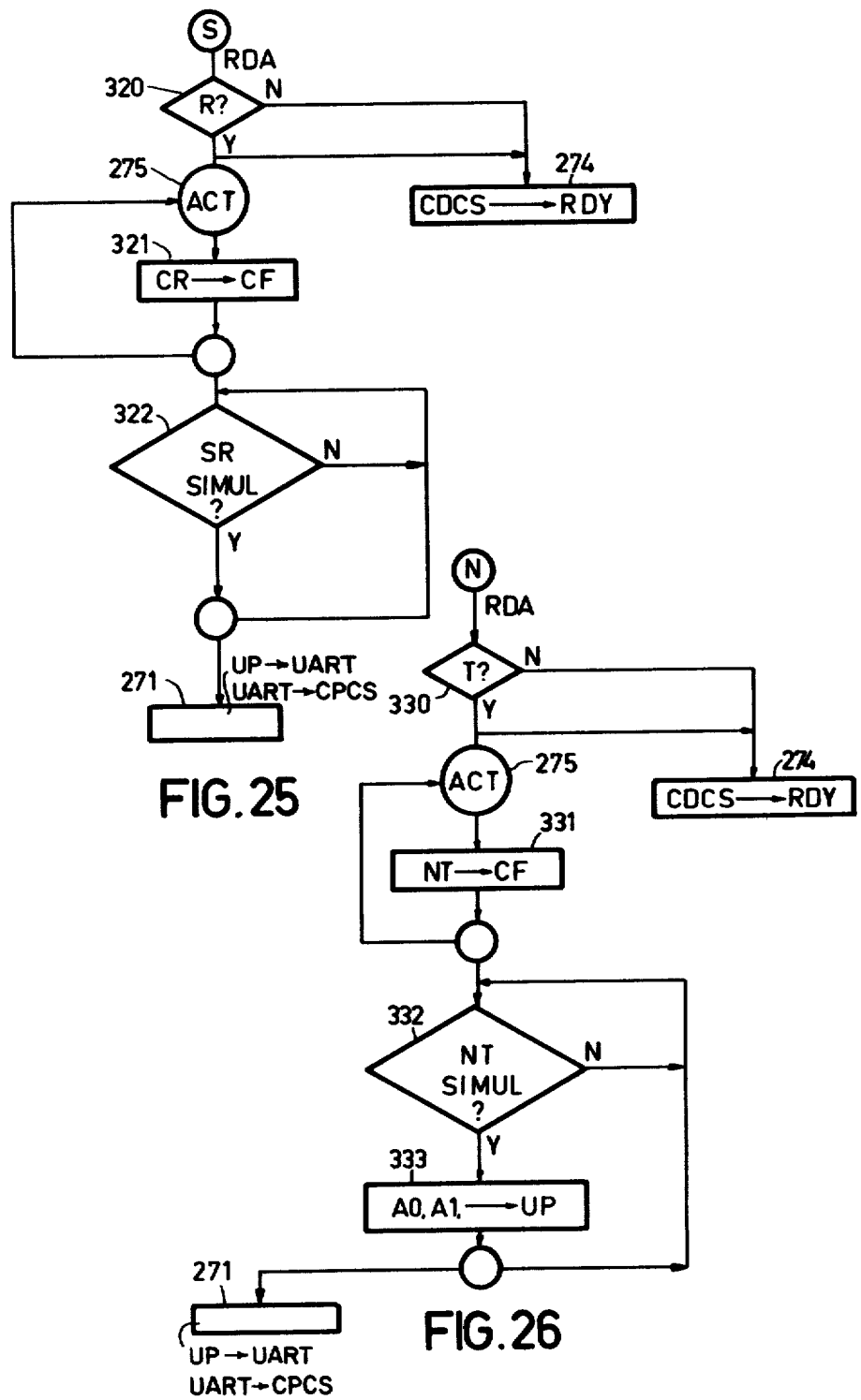

REMOTE SIMULATION BY REMOTE CONTROL FROM A COMPUTER DESK

This is a continuation of application Ser. No. 114,861, filed Jan. 24, 1980, now abandoned.

BACKGROUND OF THE INVENTION

1. Field of the Invention

The present invention is intended for use in a data processing system comprising several distributed processing units of different types which are connected to a remote central monitor and test station.

2. Description of the Prior Art

The remote simulation of commands normally available on the desk of a computer is important in several novel applications involving distributed systems, a typical example thereof being an automatic control system. The advantage of the use of a distributed system can be explained by the fact that the programmable and different functions are treated by each processing unit, connected at a distance, while the overall testing of the system may remain at the central monitor and test system which is connected to each of the distributed processing units by remote control.

The central station can monitor the status of each processing unit by transmitting the commands from the desk of a computer, or other test commands, for execution by the processing units, and by analyzing the results of the executed commands. These commands may be programmed at the central station and in such a case the periodic tests of the status of the processing units are automatically carried out; moreover, the operations based on an analysis of the tests can be automatically executed.

Several similar systems are known. One system describes the equipment for the execution of maintenance operations in a multiple processing system in which a special unit, comprising shift registers which are controlled by a central maintenance station, can be used for executing diagnostic tests. This necessitates connection of the maintenance unit to the processing unit via a special test bus. The diagnostic tests which can be performed using this technique are limited to the static commands for which the special unit has been manufactured. Another system describes the isolation of errors outside a data processing system by setting the relevant interface to a special test state, all communications originating from and going towards the interface being detoured to the simulation unit. Thus, the test state and the normal state of the system are two different states. A further system according to the present state of the art tests the peripheral units by switching to the test state in which the peripheral units are simulated by other devices.

SUMMARY OF THE INVENTION

Therefore, the present invention is characterized in that the system moreover comprises:

(a) a microprogrammed logic unit with storage means which are contained in said distributed processing units for decoding and simulating a series of specific commands, including the diagnostics of a computer desk and other test commands, originating from said central station, said simulation commands replacing the instructions normally processed by said processing units;

(b) means for testing and monitoring the results of said simulations which are incorporated in said storage and microprogrammed logic means;

(c) supplementary means for modifying said storage and microprogrammed logic means in order to simulate the series of commands which differ from the specific series, said supplementary means being added to said storage and microprogrammed logic means;

(d) remote control means for transmitting said simulation commands, originating from said central station, to said processing units, and for transmitting the results of said simulations from said processing units to said central station.

It is a main object of the present invention to provide a more flexible diagnostic capacity for a distributed processing system. The simulation unit is conceived so that the programmed logic and storage, comprising elements such as microprocessors, programmed logic circuit arrangements, (FPLA), programmable read-only memories (PROM), random access read/write memories (RAM) and first-in first-out memories (FIFO) can be modified for decoding, simulating and monitoring the simulation results of other series of commands programmed at the central station. This can be realized by definition of a new series of commands, or a supplementary series of commands, for simulation and by the addition of the necessary codes to the simulation device which is not only programmed and microprogrammed, but which is also conceived to be microprogrammable.

The means used will be described in detail in the description of the invention. Thus, the very flexible test and diagnostic commands may be designed for very precise applications with a single system concept.

Moreover, a very complex test bus is not necessary. The command for simulating the execution generally utilizes the central processor unit of the distributed processing unit, which represents an efficient use of the unit and which ensures ease of simulation of a large range of commands.

It is another object of the present invention to limit the loading of the processing unit during the monitoring.

Two states are possible:

(a) the commands are executed directly after reception; in this case, the load of the processing unit is a function of the transmission speed of the commands on the communication line. This is the unlocked state (UNLOCK);

(b) the commands are stored in a buffer and are sequentially executed in order of arrival when a given command "UNLOCK" is received. The load of the processing unit is then independent of the transmission speed on the communication line and decreases during the execution by the processing unit. This is the state LOCK.

These advantages and given other advantages of the present invention will become apparent from the following description of a preferred embodiment in accordance with the invention. The description refers to the series of P800 mini-computers manufactured by Philips Data Systems. Only the sections of a system P800 which relate to the present invention are described. The detailed descriptions of a P800 system can be found in the stated references.

BRIEF DESCRIPTION OF THE DRAWINGS

FIGS. 20 to 30 are individual flow charts describing each command test sequence.

The appendix contains:

(a) a definition of the simulation bus between the simulation unit and the central processing unit in a distributed processing unit;

(b) a definition of the modulator/demodulator (modem) interface as described in the specification CCITT V24/V28.

The design of the microcomputers P800 and the details of the interface are described in the following references, published by Philips Data Systems: (1) P 856 M/P 856 M CPU Service Manual 5111-991-2695 X (2) P 856 M/P 857 M System Handbook 5122-991-26931.

DESCRIPTION OF THE PREFERRED EMBODIMENT

Figure 1:
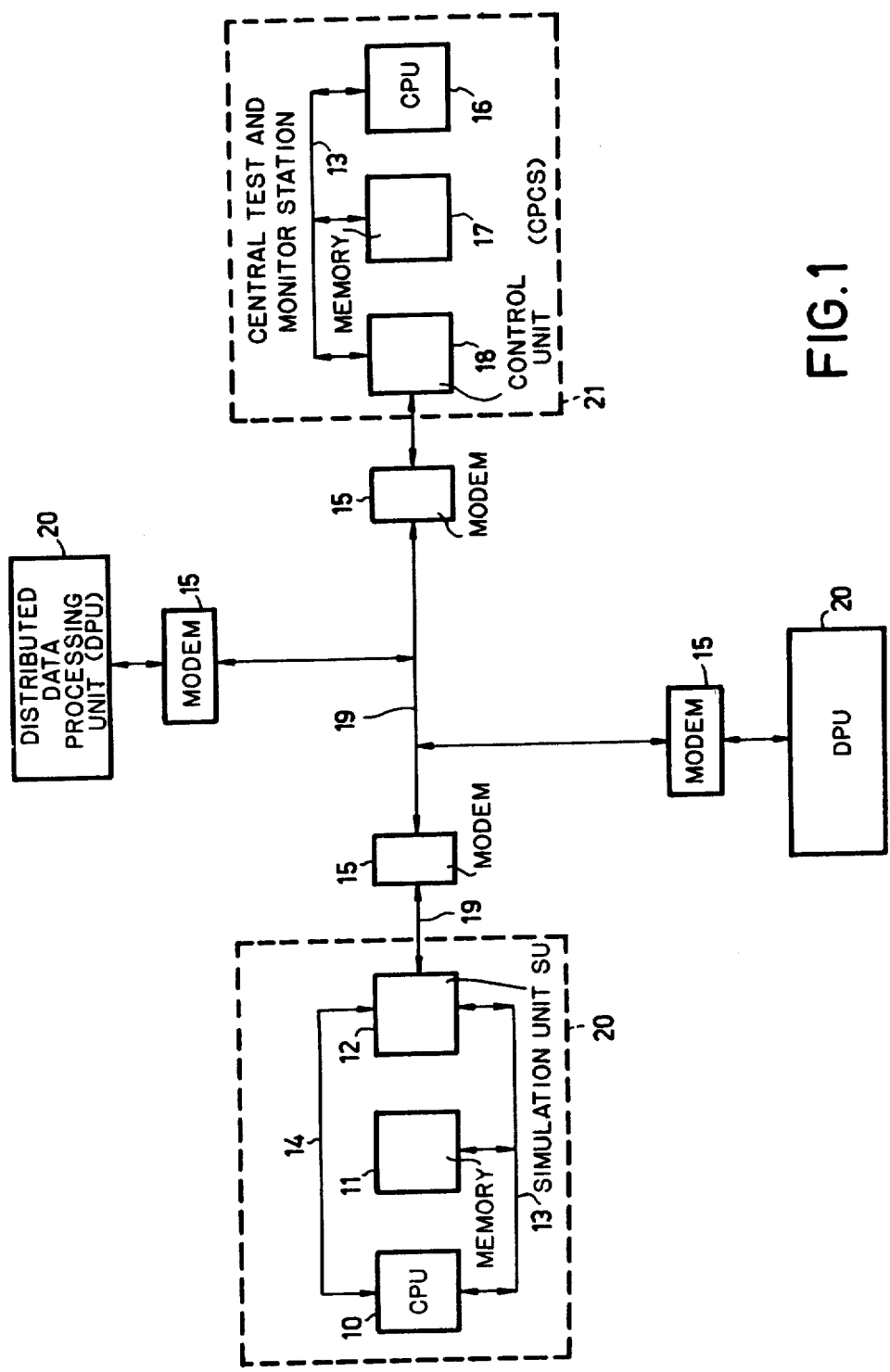
FIG. 1 shows a block diagram with the principal elements of a distributed data processing system.

FIG. 1 shows the principal elements of a distributed data processing system (DPS) in accordance with the present invention. In the FIG. 1, the reference numeral 20 is a distributed data processing unit (DPU). A DPU 20 comprises a central processing unit (CPU) 10, a memory 11 and a simulation unit (SU) 12 which performs the desk simulation of the diagnostics and other commands. The general input/output bus (GPB) between the CPU 10, the memory 11 and the SU 12 is denoted by the reference numeral 13, while the desk bus used for the simulation (SB) between the CPU 10 and the SU 12 is denoted by the reference numeral 14. The central test and monitor station (CPCS) is denoted by the reference numeral 21 and comprises a CPU 16, normally having a capacity which is much greater than that of the CPU 10, a memory 17, normally having a speed and a capacity which are much greater than that of the memory 11 of a DPU 20, and also at least one control unit 18 for testing the communications with the DPU 20.

A modulator/demodulator (modem) 15, operating in the asynchronous mode, enables transmission of data between a DPU 20 and the CPCS 21 via an asynchronous remote control line 19, which may be of a bidirectional type. The speed of the line 19 may be in the range of from 110-150-300-600-1200-2400-9600 bits/second and higher, if necessary.

The interface of the modulator/demodulator and the data links are in conformity with the international standards of CCITT V24/V28. When the DPU 20 and the CPCS 21 utilize the modulator/demodulator 15 for the connection to the line 19, in the case of one DPU 20, the modulator/demodulator 15 is connected to the SU 12, while in the case of the CPCS 21, the modem 15 is connected to a line test unit 18. The SU 12 and the line test unit 18 have modem interfaces according to CCITT V24/V28, thus enabling standardization of the communication.

In FIG. 1, a CPCS 21 is linked to several DPU 20 in a configuration of the type "multipoint". This type of connection is efficient for a DPS in which several DPU 20 are situated comparatively nearby, for example, in the same building or factory. As an alternative, the modems and the interfaces V24/V28 may be replaced by higher performance and less costly elements. Connections of the type "point to point" from a CPCS 21 to several DPU 20 are used for more distant communications. In that case, a CPCS 21 requires a separate modem 15 for each connected DPU 20, and at least one test unit 18. The number of test units 18 depends on the precise characteristics such as the speed of the connected line, the number of connections etc.

Figure 2:
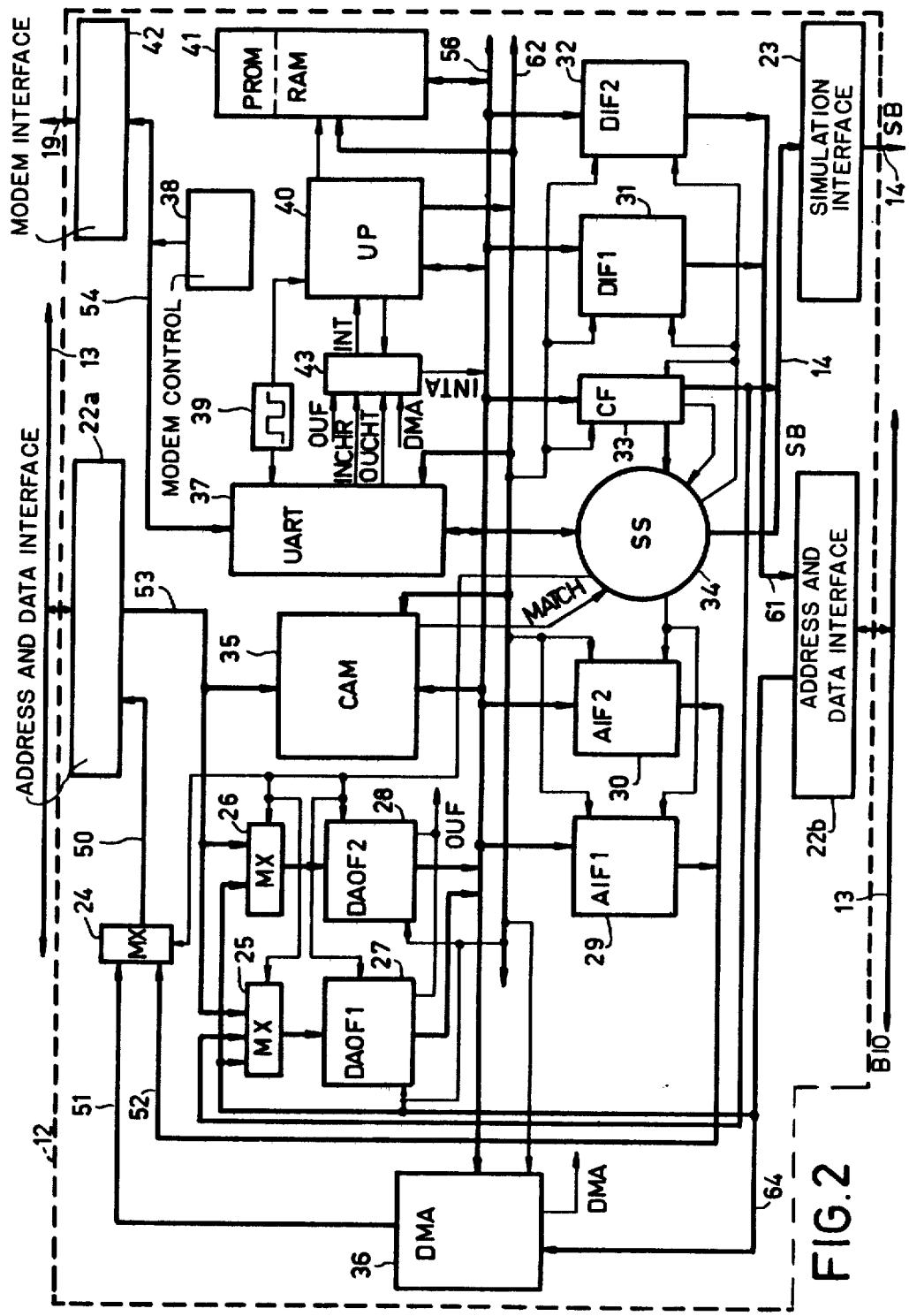
FIG. 2 shows a functional diagram of the simulation unit with the principal functional blocks and their connections.

FIG. 2 is a functional diagram showing the principal elements and the connections of the SU 12. All interfaces shown in FIG. 2 utilize the TTL technology for compatibility with the technology used in the P 800 series. The bidirectional interface elements 22a and 22b are address and data interfaces between SU 12 and GPB 13. Actually, 22a and 22b form part of the same interface. The address interface element 22a is linked to the CPU 10 and to the memory 11 via the GPB with the address lines MAD. The address interface 22a receives output address information on a 16-line address bus 50 either from the direct memory access element 36 (DMA), via a 16-line address bus 51, or from the input address FIFOs AIF1, 29 and AIF2, 30 on an address bus 52. A FIFO is a memory of the type "first-in first-out" with a shifting capacity. The FIFOs used have a width of 8 bits each and a storage depth of 64 characters of 8 bits each. The FIFOs used are of the type 2482 such as supplied by the company called Advanced Memory Devices. A 16-bit multiplexer 24, controlled by the status sequencer (SS) 34, selects the appropriate input bus, 51 or 52, for the transmission of data on the bus 50.

The input addresses received on the GPB via the address interface 22a are transmitted on the 16-line address bus 53 to a content addressable memory 35 (CAM), and to the output data and address FIFOs DAOF1 and DAOF2 (27,28). The 16-bit address transmitted on the bus 53 is separated into two addresses of 8 bits when the FIFOs DAOF1, 27, and DAOF2, 28, are loaded. The two multiplexers of 8 bits each, 25 and 26, controlled by the SS 34, select the appropriate inputs when the command has been simulated, that is to say either the address originating from the bus 53, or the data originating from the bus 64, or the simulation code originating from the bus 14. The two busses 53 and 64 are linked to the GPB 13.

The FIFOs DAOF1, 27, and DAOF2, 28, of FIG. 2 are used for the temporary storage and the transmission of data concerning the simulated command, their loading being realized under the control of the SS 34 when the command is simulated. When a character is available for transmission, an interrupt OUF originating from the DAOF1, 27, or DAOF2, 28, is despatched to the microprocessor which reads the appropriate character on the 8-line bus 56, and loads the universal asynchronous receiver transmitter (UART) 37 for the ultimate transmission to the CPCS 21.

The FIFOs AIF1, 29, and AIF2, 30, are used for storing the address during the reception of a command. This address is loaded into AIF1, 29, and AIF 2, 30, via the UART 37 and the bus 56, when the reception of the command has been completed; this address is transmitted on the address bus 52 when the command is simulated.

The input data FIFOs DIF1, 31, and DIF2, 32, are used for storing the data received with the command, these FIFOs being loaded via the UART 37 on the bus 56. Their content is read during the simulation of the command for correct execution thereof on the 16-line output data bus 61 and will be returned to the microprocessor at the end of the simulation for ultimate transmission to the CPCS 21.

The control FIFO (CF) 33 stores the commands received from the CPCS 21 and the number of parameters concerned, after decoding by the microprocessor 40. The CF 33 is loaded via the bus 56, and the stored commands are interpreted by the SS 34 which generates the necessary sequences for their simulation.

The SS 34 is an element which comprises an arrangement of programmable logic arrays of the type Signetics 82 S100 or similar. The SS34 has a bit width of 16 bits, and the states of its outputs depend on the different states of its inputs. The states of the inputs which are separated into different fields are defined by the CF 33. The outputs of the SS 34 are used for controlling the respective functional blocks described with reference to FIG. 2 during the simulation of the various commands and for controlling also the simulation interface 23 in order to ensure that the signals transmitted to the CPU 10 on the SB 14 correctly define the command to be executed by the CPU 10. Thus, the decoded commands received from the CPCS 21 and simulated by the SS 34 replace the commands from the desk normally dealt with by the CPU 10. The SB 14 is defined in the appendix. The SS 34 simulates the stored commands when it receives the command "UNLOCK". The evolution of the SS 34 in the different states will be described at a later stage.

The CAM 35 is a 4-word memory with a width of 20 bits. The output MATCH of the CAM 35 is activated when the input address corresponds to one of the four words stored therein. The signal MATCH is used by the SS 34 for executing a command CPU HALT (stopping the CPU) at the appropriate address already stored as well as for transmitting the corresponding memory address to the CPCS 21. The busses 53, 56 and 62 (a 16-line bus which forms the link between the CAM 35, the UART 37, the microprocessor 40 and the PROM 41) may be the inputs of the CAM 35.

The DMA 36 permits direct access to the memory 11 of the DPU 20. The DMA 36 utilizes two registers of 16 bits each, one of which defines the starting address of the memory block, while the other register defines the length of the memory block. The DMA 36 comprises an arithmetic unit and a PROM, thus enabling arithmetical operations for testing the transmission of the memory block. During the transmission of a memory block, the DMA 36 acts as a master and controls the GPB 13. The inputs utilize the busses 56 and 64 (control, length of the block and starting address), while the output is transmitted on the bus 51 (address in the memory (11) of the word to be transmitted).

The UART 37 provides the series/parallel conversion of the data received on the line 19 and the parallel/series conversion of the data transmitted to the line 19. The UART 37 is a commercially available logic element, for example, of the type INTEL 8251. Moreover, the UART 37 controls the formation of the characters and performs a vertical redundancy check (VRC). The VRC generates a parity bit (a choice can be made between even parity and odd parity) in the output mode and tests the parity bit in the input mode. If a parity error is detected, the relevant command will not be simulated and the DPU 20 will not respond to the command despatched by the CPCS 21.

The modem 38 controls the dialog on the bus 54 between the modem interface 42 and the UART 37. The modem interface 42 complies with the specifications of CCITT V28.

The clock 39 generates the pulses used by the UART 37 for the asynchronous transmission of characters at a speed of 16 times the frequency of the line 19. It supplies the pulses used by the microprocessor 40 with a fundamental frequency of 4 MHz.

The microprocessor 40 is a system having a capacity of 8 bits such as the INTEL 8085 or similar. The microprocessor 40 executes the necessary sequences for decoding the commands received from the CPCS21; moreover, it controls the interaction between the functional blocks already described and provides the overall control for the SU 12. The latter depends on the programs stored in the memory 41 which comprises a PROM section and a RAM section The supplementary commands may be added or the existing commands may be modified by the modification of the SS 34 and by the changing or the modification of the programs in the PROM section of the memory 41. Moreover, the overall control of the SU 12 by the microprocessor 40 may also be modified in a flexible manner either by modification of the control program in the PROM 41, or by electronic reprogramming, or by the replacement of this PROM section.

The interruption system 43 comprises several flipflops, each of which is capable of setting a particular interrupt signal to 1. The principal interrupts are:

INCHR: the UART 37 has received a character from the line 19 for decoding by the microprocessor 40;
OUCHT: the UART 37 is ready to transmit an output character to the line 19;
OUF: the DAOF1, 27, and DAOF2, 28, are ready for transmission;
DMA: the DMA 36 is ready for transmission.

The outputs of the flipflops are combined in an OR-gate for supplying a common interrupt signal INT to the microprocessor 40 which reads, via the bus 56 (interrupt vector), the states of the flipflops in order to identify the interrupt source and to start the appropriate interrupt routine. The interrupt signals may have different priority levels, for example, the interrupt DMA has a priority level which is higher than that of the other interrupts, and consequently it will be processed before the other interrupts. During the processing of the interrupt, it is automatically reset to 0 by the microprocessor. The signal INTA, originating from the microprocessor 40, triggers the presentation of the interrupt vector on the bus 56.

Each of the commands simulated according to the present invention consists of a set of ASCII characters (American Standard Code for Information Interchange) of 8 bits each. The format is as follows:
EOT: character defining the start of the sequence,
AD: two characters defining the address of the DPU,
XX: two characters defining the exact command.

Some of the following characters define the parameters for the exact commands.

The following commands are simulated according to the present invention. All commands originate from a CPCS 21 and are transmitted to a DPU 20 for simulation.

(1) UNLOCK (triggering): EOT, AD, ENQ,

When this command is received, the SU 12 can simulate all following commands which will be immediately executed upon receipt. The exact address AD ensures that a single DPU 20 will respond to this command in a "multipoint" configuration.

(2) LOCK (triggering): EOT, AD, CAN,

When this command is received, the SU 12 can no longer simulate the subsequent commands. Consequenly, a DPU 20 can operate in an isolated state, if necessary. The commands received in the state LOCK will be stored in the CF 33 for later simulation. A given number of commands can be stored in dependence of the width of the buffer memories. Thus, in the state UNLOCK, each command received is directly simulated, thus halting the CPU 10 during the transmission and the execution of the commands. In the state LOCK, a series of commands is stored and simulated at a later stage when the command UNLOCk has been decoded. Consequently, the CPU 10 is halted only during the execution of the commands. Thus, the delay caused by transmission is avoided.

(3) LOAD THE REGISTER: EOT, AD, C, I, D0, D1, N R

This command (CI) loads one of the 16 registers (NR) with the two data characters D0, D1. After execution of this command, the SU 12 subsequently transmits the command characters (CI) and the data D0, D1 to the CPCS 21 for verification.

(4) LOAD THE MEMORY: EOT, AD, L, M, D0, D1, A0, A1

This command (LM) loads the data D0, D1 in the memory 11 of the DPU 20 at the address defined by A0, A1. After execution of this command, the SU 12 transmits the command characters and the data to the CPCS 21 for verification.

(5) READ THE REGISTER: EOT, AD, R, R, N R

In reaction to this command (RR), the command characters and the content of the specified register (NR) are returned to the CPCS 21.

(6) READ THE MEMORY: EOT, AD, R, M, A0, A1

In reaction to this command (RM), the command characters and the content of the specified memory address (A0, A1) are returned to the CPCS 21.

(7) READ THE STATUS WORD: EOT, AD, R, S

In reaction to this command (RS), the command characters and the content of the status register (that is to say, the level of the program, the enable register, the status flipflop, etc.) are returned to the CPCS 21.

(8) RUN EOT, AD, S, R

This command (SR) triggers the execution, by the CPU 10, of a program whose address is loaded in the program counter (PC). The command characters are retransmitted to the CPCS 21 if this command is executed.

(9) INSTRUCTION: EOT, AD, N, T

In a reaction to this command (NT), the CPU 10 executes the current program in the rhythm of one instruction at the time. After the execution of each instruction, the address of the next instruction is transmitted to the CPCS 21 via the line 19. Thus, the program branches can be monitored. The command characters are transmitted with the results of the execution of this command.

(10) IPL: EOT, AD, P, L, D0, D1

This command (PL) triggers the loading of the initial program (IPL) as defined by D0, D1. It is necessary to program an other command such as READ THE STATUS WORD in order to ensure that the flipflop RUNFA is reset to 0 before this command is used. If RUNFA is set to 1, this command is not simulated by the SS 34, so that it is not executed by the CPU 10. The command characters are retransmitted to the CPCS 21 if this command has been executed.

(11) MCLEAR (reset to 0): EOT, AD, M, C

This command (MC) resets all elements (such as the status flipflops, the indication of particular conditions, etc.) in a DPU 20 to 0 if the CPU 10 is halted, that is to say when the flip-flop RUNFA is reset to 0. If RUNFA is set to 1, this command is not simulated by the SS 34 so that it is not executed by the CPU 10. It is necessary to program an other command such as READ THE STATUS WORD (RS) in order to ensure that RUNFA is reset to 0 before a command MCLEAR is used. In the case where this command is executed by the CPU10, the command characters are transmitted to the CPCS 21.

(12) CP INTERRUPTION: EOT, AD, I, T

This command (IT) despatches an interrupt request with a priority level as allocated to the desk of the CPU 10.

(13) STOP AT A PREDETERMINED ADDRESS: EOT, AD, H, P, Co, A0, A1

This command (HP) stops the CPU 10 when a predetermined address is encountered. The field Co defines the type of access which will stop the CPU 10, that is to say reading only, writing only, or reading/writing; moreover, it validates or invalidates the command. The predetermined address A0, A1 is stored in the CAM 35 and if coincidence is established between this predetermined address and an address of the current program, the CPU 10 is stopped and the corresponding address is transmitted to the CPCS 21. The CAM 35 can store several predetermined addresses.

(14) DUMP MEMORY: EOT, AD, D, T, L0, L1, A0, A1

The memory block whose starting address (A0, A1) and length (L0, L1) are specified by the command (DT) is despatched to the CPCS 22 at the transmission speed of the line.

Figure 3:
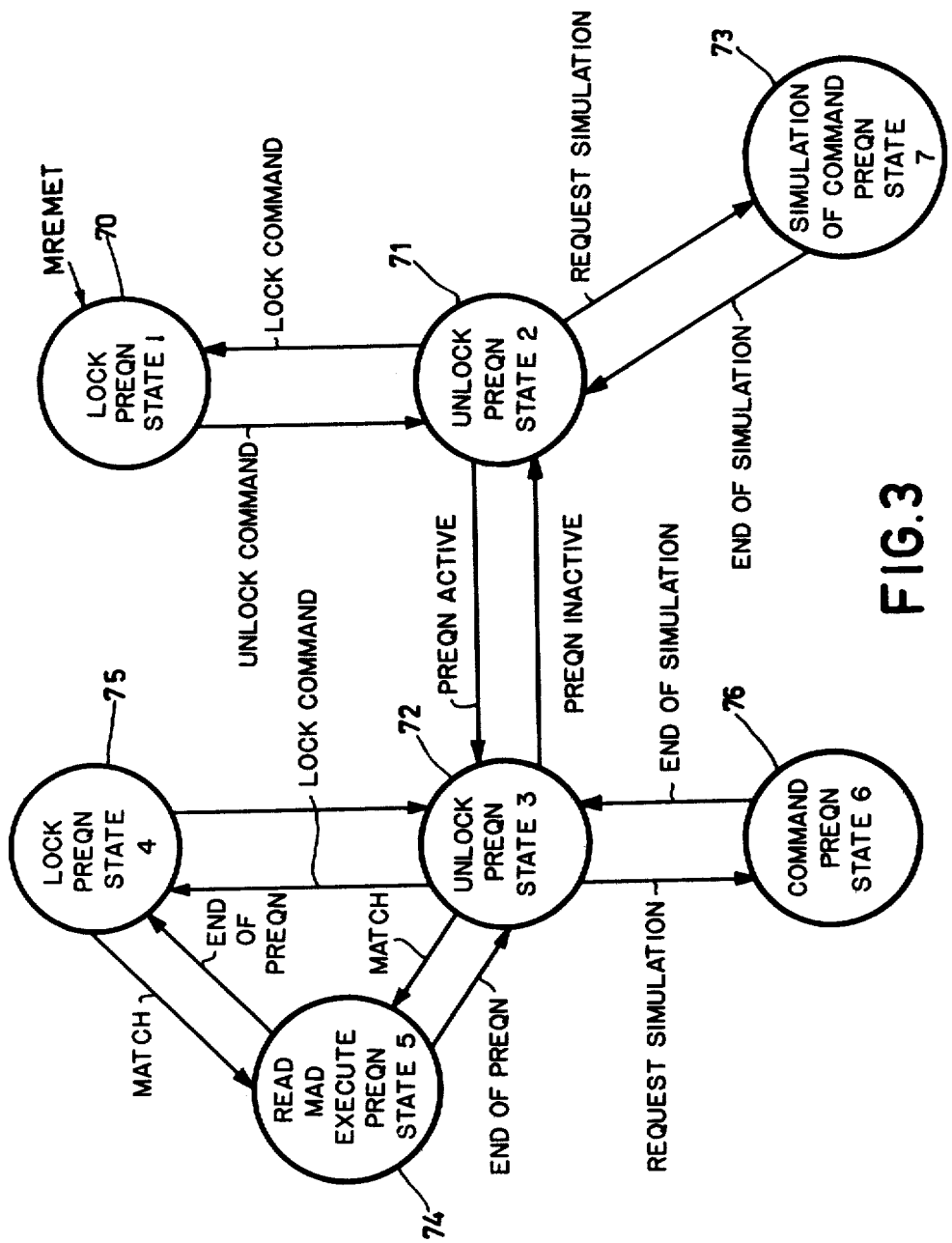
FIG. 3 is a status diagram showing the principal logic states of the status sequencer used for the simulation of the commands received from a central test and monitor station.

FIG. 3 is a status diagram showing the principle states which can be assumed by the SS 34 in order to test the simulation of the defined commands.

In FIG. 3, the reference numeral 70 represents the state LOCK (STATE 1). In this state, the SS 34 does not simulate the commands stored in the CF 33. When the command UNLOCK is received from the microprocessor 40, the SS 34 assumes the state UNLOCK (STATE 2) which is denoted by the reference numeral 71.

In the state UNLOCK (STATE 2), the SS 34 simulates the commands stored in the CF 33. If the command STOP AT A PREDETERMINED ADDRESS (PREQN) is to be simulated, the SS 34 assumes the STATE 3, denoted by the reference numeral 72. If a command other than the command PREQN is to be simulated, the SS 34 assumes the STATE 7 which is denoted by the reference numeral 73. The state 3 is the state UNLOCK with PREQN. The STATE 3, denoted by the reference numeral 72, is the same as the state 2 denoted by the reference numeral 71, the difference being that, when the signal MATCH is detected (coincidence between the address lines MAD 53 and a predetermined address stored in the CAM 35), the SS 34 proceeds to the STATE 5, which is denoted by the reference numeral 74. Otherwise, it proceeds either to the STATE 6, denoted by the reference numeral 76 which is the state of the command simulation, or to the STATE 2 if the command STOP AT A PREDETERMINED ADDRESS is suppressed (PREQN), which is denoted by the reference numeral 71.

The STATE 4 is the state LOCK with PREQN, denoted by the reference numeral 75. The STATE 4 is similar to the STATE 1, except for the fact that this state becomes STATE 5 when the signal MATCH is activated. When the command UNLOCK is received, the STATE 4 becomes STATE 3.

The STATE 5, denoted by the reference numeral 74, simulates PREQN, that is to say the relevant address is transmitted to the CPCS 21. The STATE 5 may change to the STATE 3 or to the STATE 4, depending on whether the command has been simulated in the state LOCK or in the state UNLOCK, respectively.

The STATES 6 and 7, denoted by the reference numerals 76 and 73, test the simulation of the commands, the difference being that the STATE 6 simulates the commands with PREQN (active), while the STATE 7 simulates these commands with $\overline{\text{PREQN}}$ (inactive).

The sequences of the changing of states and their permitted direction are indicated by arrows between the various states.

Figure 4:
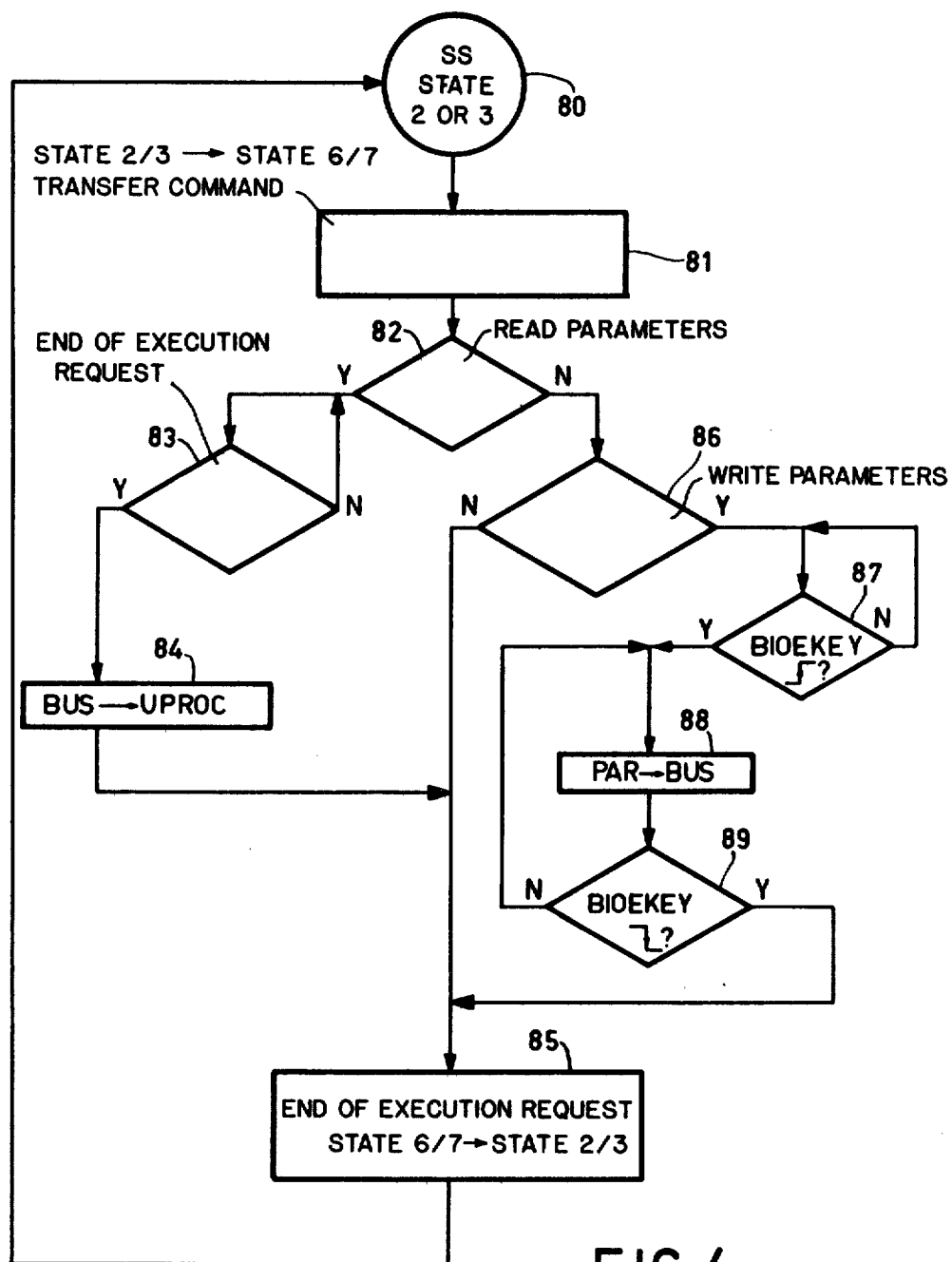
FIG. 4 is a flow chart describing the general simulation sequence used by the status sequencer during simulation of commands.

FIG. 4 is the flow chart showing the general sequence executed by the SS 34 during simulation of commands. When the command UNLOCK is received, the SS 34 assumes either the STATE 2 or the STATE 3; the sequences 71 and 72 in FIG. 3. The SS 34 can then simulate the commands stored in the CF 33, while proceeding to the STATES 6 or 7 and while despatching the simulated command on the SB 14, via the logic interface 23, sequence 81. In dependence of the exact command, given parameters have to be read, this test being represented by the reference numeral 82. If there are parameters to be read, these parameters are read and an End of Execution Request is carried out, sequence 83. After completion of this test, the appropriate data is despatched to the microprocessor 40, sequence 84, and a jump to the STATE 2-3 takes place, sequence 85. If the test 83 does not detect the end of the execution request, this test is repeated until the relevant execution has been performed.

If these are no parameters to be read for the test 82, a jump takes place to the test 86 for testing if there are parameters to be written. If not, this is the end of the execution request and the SS 34 proceeds to the STATE 2-3 by a jump via the block 85. If parameters are to be written in the test 86, a synchronization signal BIOEKEY is tested in the test 87. BIOEKEY is a synchronization signal which travels from the CPU 10 to the SU 12 and whose change of state defines the occurrence of a specific activity. The activation of BIOEKEY in this context defines a change of state, that is to say the switching from either a high state to a low state (Z), or from a low state to a high state ($\overline{Z}$). The changing of the state of BIOEKEY—test 87—initiates the transmission of the parameters on the GPB 13 as denoted by the block 88, and BIOEKEY is tested again in the test 89. If BIOEKEY has not changed its state in the test 89, the parameters are maintained on the GPB 13. When BIOEKEY is activated, implying that the parameters have been transmitted to the CPU 10, the SS 34 proceeds to the STATE 2-3 in the block 85, as has already been described.

The simulation of the commands received from the CPCS 21 will be described in detail with reference to FIG. 5 and the flow charts of the FIGS. 6 to 16.

Figure 5:
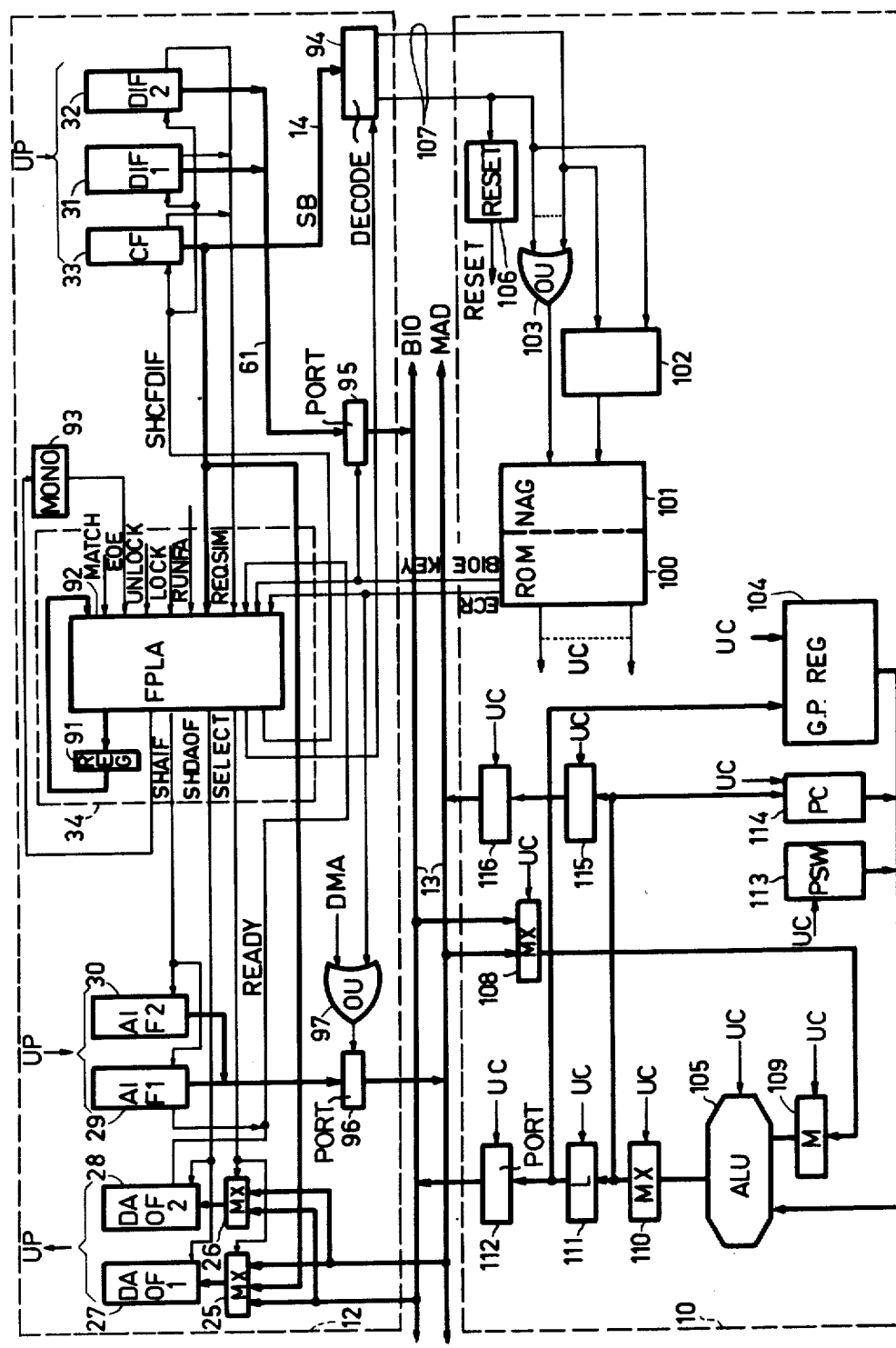
FIG. 5 is a logic block diagram showing the specific elements of the simulation unit of the central data processing unit and the bus connections required for the simulation and the execution of the commands.

FIG. 5 is a logic block diagram of the elements of the SU 12, the CPU and the GPB 13 which are required for the simulation of the commands. The overall testing and control of the SU 12 will be described hereinafter. The most important elements of FIG. 2 are again shown in FIG. 5; other elements such as the SS 34, the signals and the logic connections are described in detail. As has already been described, the SS 34 comprises an FPLA 92, the outputs of which are linked to a status register 91. The register 91 is in its turn connected to the input of the FPLA 92. Depending on the actual state of the SS 34 and the occurrences on the input of the SS 34, the register 91 will be loaded with the next state which will thus become the new actual state, as described with reference to FIG. 3.

The SS 34 comprises several other test inputs, such as the command inputs of the CF 33, the input MATCH, the Simulation Request Signal REQSIM, etc., while it outputs test the execution of the commands for the simulation by the transmission of the appropriate test signals via the SB 14 and by the testing of the appropriate FIFOs. A monostable multivibrator 93 makes the SS 34 proceed to either the STATE 2 or the STATE 3 at the end of an Exchange or an Execution (EOE).

The CPU 10 comprises a test ROM 100 which stores the microinstructions used for executing the set of instructions of the series P800. An associated address generator (NAG), denoted by the reference numeral 101, calculates the address of the next microinstruction. Various other processing registers are used and will be described, when necessary, in the detailed description of each command.

The simulation signals transmitted on the SB 14 are analyzed by the CPU 10 (102 in the Figure) in order to calculate the address of the appropriate microinstruction, or the sequence of the microcommands for the execution. These microcommands test the execution of the command in the CPU 10, and the transmission of data originating from or going to the GPB 13. The memory 11, not shown in FIG. 5, is connected to the GPB 13 and is controlled either by the ROM 100 or by the DMA 36 in the case of a command DUMP MEMORY. The assembly of OR-gate denoted by the reference numeral 103 produces a signal to activate NAG 101 when a command is to be simulated. A logic element 106 generates a signal RESET which resets all relevant elements in a DPU 20 to 0 when the command MCLEAR is executed. The signal READY indicates that the FIFOs 27 to 30 have either been loaded or are ready for a new write operation. The SS 34 upon this signal changes its state, if necessary. The signal RUNFA from the CPU 10 defines the state of the CPU. In RUNFA is set to 1, given commands such as MCLEAR, IPL are not simulated by the SS 34. The use of other signals will be explained in the relevant context.

The FIGS. 6 to 16 are flow charts of the simulation sequence of the SS 34 for each of the defined commands. A description is given only of the commands received by the CPCS 21 and executed by the CPU 10 under overall testing by the SU 12 and the precise testing by the SS 34. The instructions normally executed by the CPU10 are not taken into account.

If the signal LOCK on the input of the SS 34 is activated, the latter cannot simulate the commands, until the reception of the command UNLOCK (the signal LOCK on the input of the SS 34 is deactivated and the signal UNLOCK is activated), when the SS 34 proceeds to the STATE 2 or 3 as described with reference to FIG. 3. The SS 34 can then decode and simulate the commands stored in the CF 33.

Figure 6:
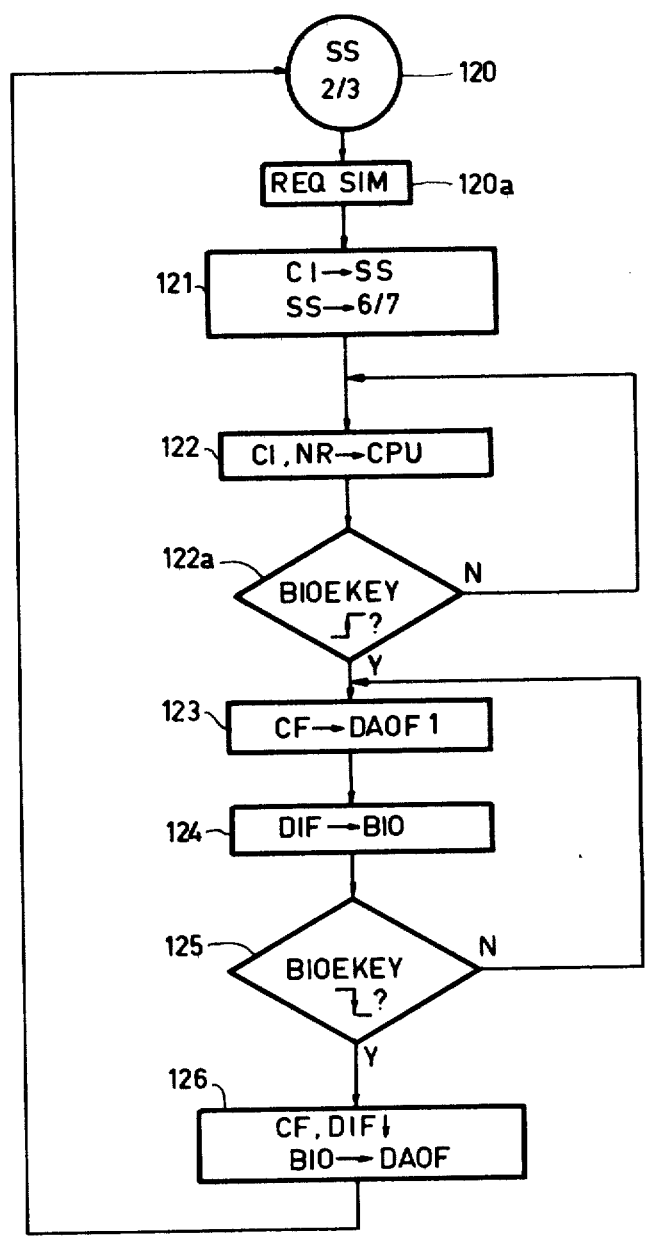
FIGS. 6 to 16 are individual flow charts describing the detailed simulation of each decoded command of the series of commands according to the present invention.

FIG. 6 is the flow chart representing the simulation of the command LOAD THE REGISTER (LR) and this simulation sequence is described by the logic diagram of FIG. 5. The SS 34 is in the STATE 2 or 3 (120 in the flow chart 6) upon receipt of the simulation request REQSIM from the microprocessor 40 (block 120a), the command (LR) thus being applied to the input of the FPLA 92; the next state of the SS 34 is the STATE 6 or 7 as denoted by the reference numeral 121. The command is subsequently despatched from the CF 33 to the CPU 10, via the SB 14. The decoding element 94 (FIG. 5) comprises a number of logic gates which decode the commands as defined in the appendix.

For each command simulation, a test line is activated, and is subsequently analyzed by the CPU 10 in order to execute the appropriate command. The decoding of the commands is tested by the output of the SS 34, DECODE. After the transmission of the command, the register number (NR) is despatched on the SB 14, and the decoding is performed by the four lines (RCP0—RCP3). These activities are represented by the block 122.

In order to execute the current command, the CPU 10 interrogates the decoded command lines, as indicated by 107 in the FIG. 5. The microprogram selected from the ROM 100 depends on the type of decoded command.

Subsequently, the SS 34 tests the activation of the signal BIOEKEY of the CPU 10. If BIOEKEY is not activated in the test 122a, the CPU 10 is not ready to accept the command and a jump is made to the block 122, that is to say the command (LR) and the register number (NR) are held on the SB 14 until the instant at which BIOEKEY is activated (change of state) in the test 122a. When BIOEKEY is activated, the data D0, D1 from the FIFOs DIF1, 31, and DIF2, 32, are transmitted on the data lines BIO of the GPB 13, via a set of logic gates 95 as denoted by the block 124.

Each time when a command is simulated, the command code of the CF 33 and the number of parameters are loaded in the FIFO DAOF1, 27, by the test signal SHDAOF (DAOF shifted) in order to inform the microprocessor 40 that the command has been simulated, block 123 in FIG. 6. At the end of the execution, the microprocessor 40 transmits the results to the CPCS 31, and also the appropriate parameters. The data D0, D1 is loaded on the lines BIO, block 126. The signal BIOEKEY is tested again in the test 125, and if it is not activated, the data lines BIO hold the data D0, D1, a jump being made to the block 124. The activation of the signal BIOEKEY in the test 125 indicates that the CPU 10 has read the lines BIO and, consequently, that it executes the relevant command.

The content of the CF 33 and the FIFOs DIF1, 31, and DIF2, 32, is shifted under the control of the signal SHCFDIF, in order to position the next command for the simulation, the content of the lines BIO being loaded into the FIFOs DAOF1, 27, and DAOF2, 28, under the control of the signals SHDAOF and SELECT, and the SS 34 proceeds to the STATE 2 or 3, these functions being represented by 126 in FIG. 6. Thus, the data D0, D1 loaded into the CPU 10 is copied in the buffer memories DAOF (27 and 28) for ultimate transmission to the CPCS 21 which verifies these data. The buffering is necessary to prevent delay of the CPU 10. The CPU 10 executes commands at a speed which is much higher than that of SU 12 which can transmit the results of this execution only at the speed of the line 19.

The CPU 10 reads the data of the lines BIO of the GPB 13 and stores these data in the general register 104 defined by the command. The route (with reference to FIG. 5) extends via the multiplexer 108, the register M 109, the arithmetic unit (ALU) 105, the multiplexer 110 and the register L 111, all these elements being tested by suitable microcommands (UC) from the ROM 100.

Figure 7:
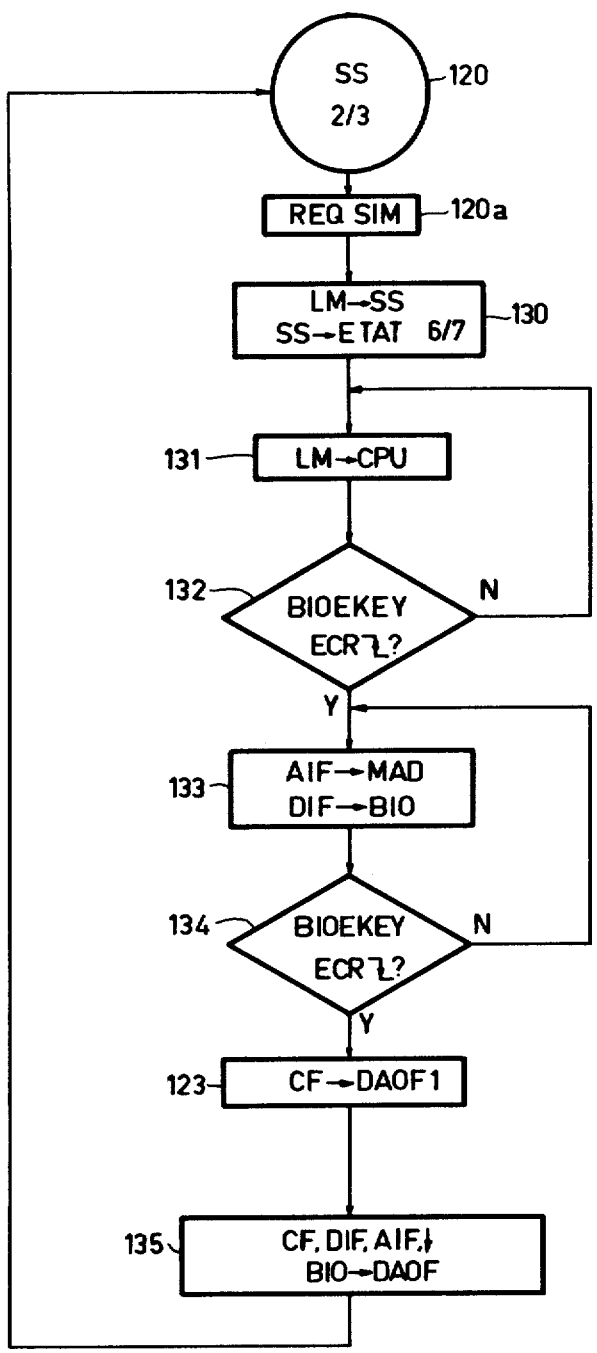

FIG. 7 shows the flowchart for the simulation of the command LOAD THE MEMORY (LM). The SS 34 is still in the STATE 2 or 3, 120 in FIG. 7. When the simulation request REQSIM (block 120a) is received, the command LM is applied to the SS 34 and is also transmitted to the CPU 10, as has already been described, the SS 34 then proceeding to the STATE 6 or 7 as denoted by the blocks 130 and 131. In the test 132, the signals BIOEKEY and ECRIRE are tested by the SS 34. As has already been stated, activation of BIOEKEY means that the command has been accepted by the CPU 10, and that the data D0, D1 may be loaded on the lines BIO, while ECRIRE implies that the address A0, A1 may be loaded on the address lines MAD. If one or both of these signals are inactive, a jump takes place to the block 131, i.e. the command loaded on the SB 14 is maintained without modification. When both signals are active, the address A0, A1 of the AIF1, 29, and AIF2, 30, is loaded on the lines MAD, via a set of output gates 96, tested by the signal SHAIF (AIF shifted). The signal ECRIRE opens the gates 96, via the OR-gate 97. Similarly, the data D0, D1 is transmitted on the lines BIO of the GPB 13, via the output gates 95, tested by the activated signal BIOEKEY. These sequences are shown in the block 133.

The signals BIOEKEY and ECRIRE are tested again in the test 134. If they are both activated, CPU 10 has accepted the data and address parameters. If one or both signals are not activated, a jump is made to the block 133, i.e. the lines MAD and BIO are maintained. If the test 134 reveals that both signals are activated, the DAOF1, 27, is loaded with the content of the CF 33 in order to inform the microprocessor 40 that the simulation of the command is executed (block 123). The CF 33 and the FIFOs DIF 1, 31 and DIF 2, 32, are shifted under test by the signal SHCFDIF, the FIFOs AIF1, 29, and AIF2, 30, being shifted under test by the signal SHAIF in order to position the next command; the content of the lines BIO is loaded into the FIFOs DAOF1, 27, and DAOF2, 28, and the SS 34 proceeds to the STATE 2 or 3, these sequences being represented by the block 135.

For this command, the CPU 10 despatches the memory address and the data to be loaded directly to the memory 11; suitable microcommands test the loading of the data.

Figure 8:
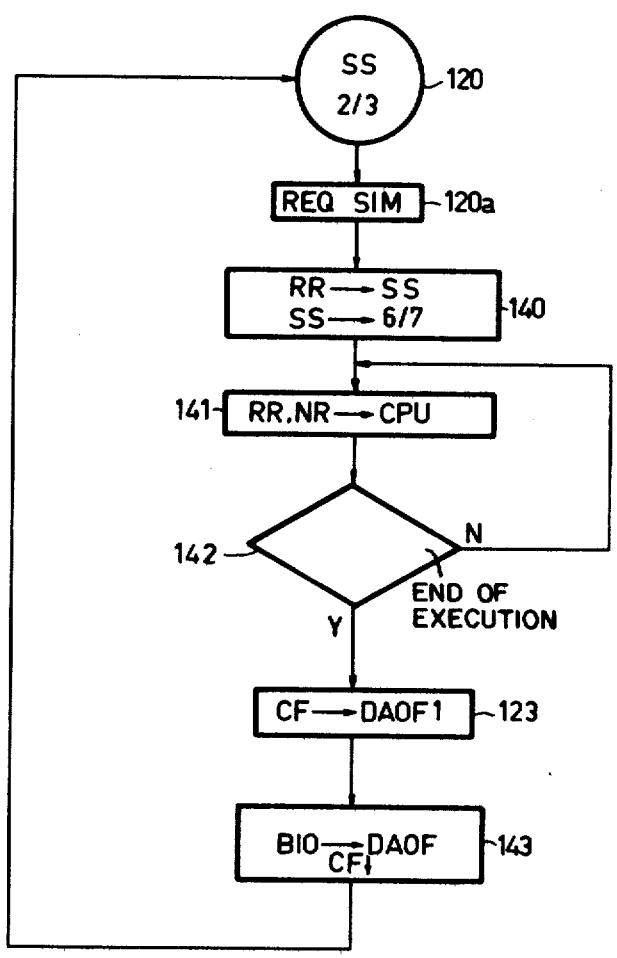

FIG. 8 is a flow chart of the simulation of the command READ THE REGISTER (RR).

The SS 34 is still in the STATE 2 or 3, 120 in FIG. 8. When the request REQSIM is received, block 120a, the command RR is transmitted to the SS 34 which, consequently, proceeds to the STATE 6 or 7, block 140. The command RR and the number of the register NR are despatched to the CPU 10, block 141. For this simulation of the command, there is no data to be transmitted to the CPU. The SS 34 tests the end of the execution of the command by CPU 10 in the test 142. The end of the execution may be implicit or explicit, depending on the command simulated. The SS 34 changes its state in reaction to specific actions, for example, the end of the execution. This can be realized when the last operation of the simulation is carried out, or because a specific signal of the CPU 10 is activated, for example, BIOEKEY. If the end of the execution is not detected during the test 142, the SS 34 awaits such activation and saves the command RR and the number of the register NR on the SB 14, i.e. a jump takes place to the block 141 of FIG. 8. When the execution is indeed ended, the already described sequence 123 is executed.

The CPU 10 loads the content of the register to be read, 104, onto the lines BIO via the ALU 105, the multiplexer 110, the register L 111 and the output gates 112. The test signal SELECT of the SS 34 selects the appropriate inputs of the multiplexers 25 and 26 in order to ensure that the data on the lines BIO can be loaded into the FIFOs DAOF1, 27 and DAOF2, 28, under test by the signal SHDAOF, for ultimate transmission to the CPCS 21. The CF 33 is shifted in the described manner. These sequences are represented by the block 143, the SS 34 proceeding to the STATE 2 or 3.

Figure 9:
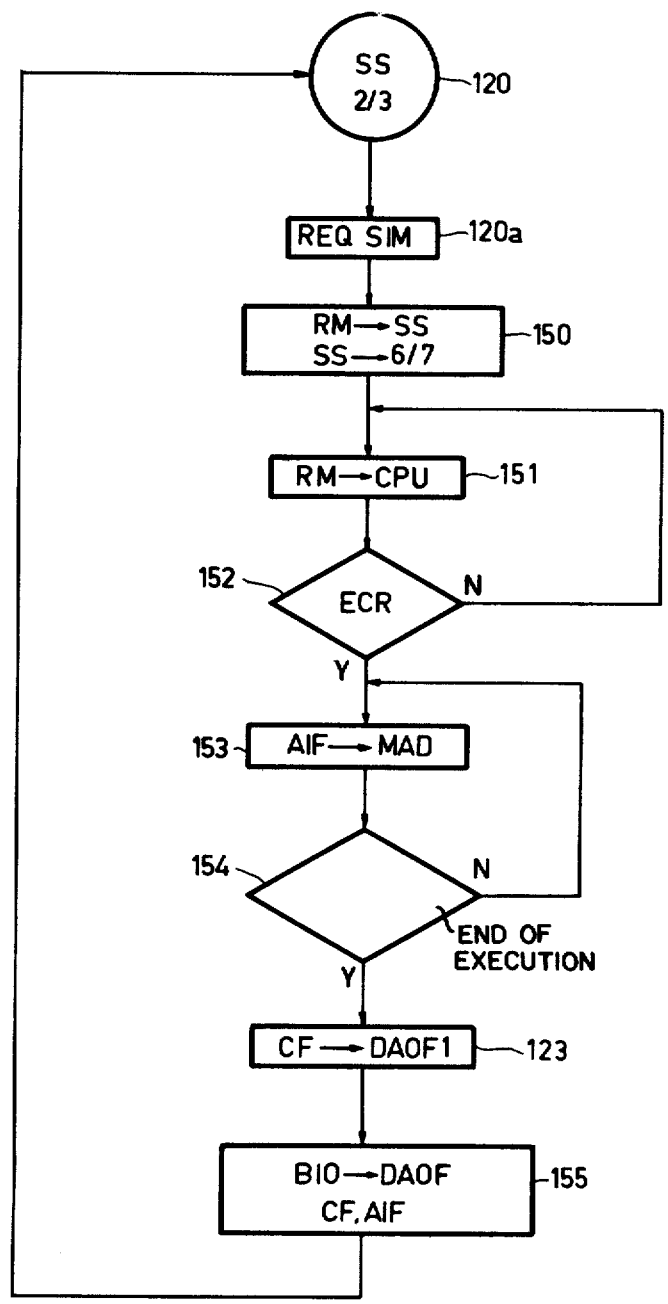

FIG. 9 is a flow chart representing the simulation of the command READ THE MEMORY (RM). The SS 34 is in the STATE 2 or 3; block 120. The request REQSIM, block 120a, activates the SS 34. The command RM is also despatched to the CPU 10, the SS 34 proceeding to the STATE 6 or 7, sequences 150 and 151. The CPU 10 analyzes the command and activates the signal ECRIRE. The state of ECRIRE is tested in the test 152. If it is not active, the command is saved on the SB 14 until the instant at which ECRIRE is activated, that is to say a jump takes place to the block 151. When the signal ECRIRE is activated, the address A0, A1 loaded in the FIFOs AIF1, 29, and AIF2, 30, is transmitted on the lines MAD under test by the signal SHAIF, the output gates 96 being opened by the signal ECRIRE. The sequences are denoted by 153. The end of the execution is finally tested in the test 154. If the execution is not complete, the address is saved on the lines MAD, a jump being made to the block 153. When the execution of the command is complete, the sequence 123 is executed. The end of execution indicates that the CPU 10 has transmitted the content of the addressed memory location directly on the lines BIO. As has already been described, the content of the lines BIO is subsequently loaded into the DAOF1, 27, and DAOF2, 28, the CF 33, the AIF1, 29, and AIF2, 30, are shifted and the SS 34 proceeds to the STATE 2 or 3, these sequences being denoted as 155.

Figure 10:
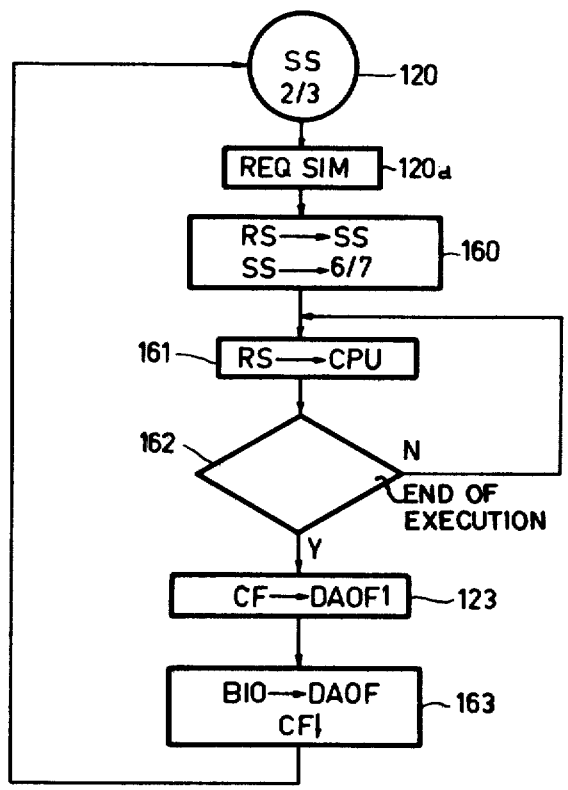

FIG. 10 is the flow chart of the simulation of the command READ THE STATUS WORD (RS).

The SS 34 is still in the STATE 2 or 3, block 120. When the simulation request REQSIM is received, block 120a, the command RS is presented to the SS 34 and despatched to the CPU 10, the SS 34 then proceeding to the STATE 6 or 7, sequences 160 and 161 in FIG. 10. The CPU 10 analyzes and executes the command, that is to say it loads the content of the program status register (PSW) 113 on the lines BIO, via the ALU 105, the multiplexer 110, the register L111, and the output gates 112. The SS 34 tests the end of the execution in the test 162 and, if it is not complete, a jump is made to the block 161, which means that the SS 34 maintains the data on the SB 14. When the end of the execution is detected, the sequence 123 is executed again. The data on the lines BIO are loaded into the DAOF1, 27, and DAOF2, 28, the CF 33 is shifted and the SS 34 proceeds to the STATE 2 or 3, these sequences being represented by 163.

Figure 11:
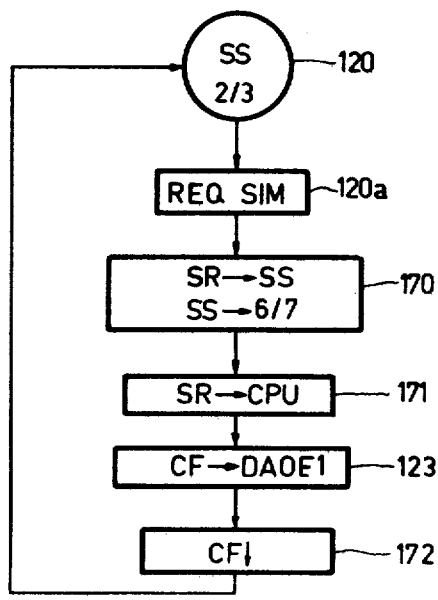

FIG. 11 is the flow chart of the simulation of the command RUN (SR). The SS 34 is in the STATE 2 or 3, block 120. When the signal REQSIM is received, block 120a, the command SR is presented to the SS 34 which proceeds to the STATE 6 or 7, block 170. At the same time, the command is applied to the CPU 10, block 171, which analyzes this command and which starts the execution of its current program, beginning with the address loaded into its program counter (PC) 114. The sequence 123 is thus executed and the CF33 is stepped, sequence 172, and the SS 34 proceeds to the STATE 2 or 3.

Figure 12:
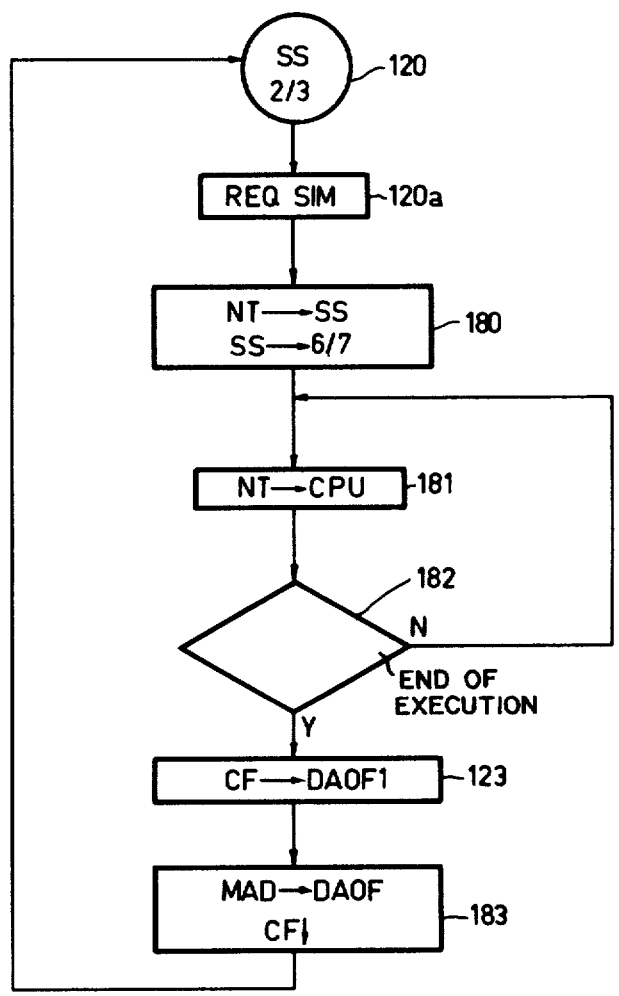

FIG. 12 is the flow chart of the simulation of the command INSTRUCTION (NT). The SS 34 is in the STATE 2 or 3, block 120. When the signal REQSIM is received, block 120a, the command NT is presented to the SS 34 which proceeds to the STATE 6 or 7 and at the same time the command is applied to the CPU 10, sequences 180 and 181. The CPU 10 analyzes the command and executes the current instruction defined by its address in the PC 114. At the end of the execution of the instruction, the CPU 10 loads the lines MAD with the address of the next instruction, following the route via the PC 114, the ALU 105, the multiplexer 110, the register S 115 and the output gates 116. As has already been described, the SS 34 tests the end of the execution during the test 182, the SB 14 holding the data until the end of the execution. When the execution of the instruction has been completed, the sequences 123 is executed. The DAOF1, 27, and DAOF2, 28, are loaded with the address of the next instruction, via the lines MAD, under test by the signal SHDAOF, the appropriate inputs of the multiplexers 25 and 26 being selected by the signal SELECT. The CF 33 is shifted and the SS 34 proceeds to the STATE 2 or 3, these sequences being denoted as 183.

Figure 13:
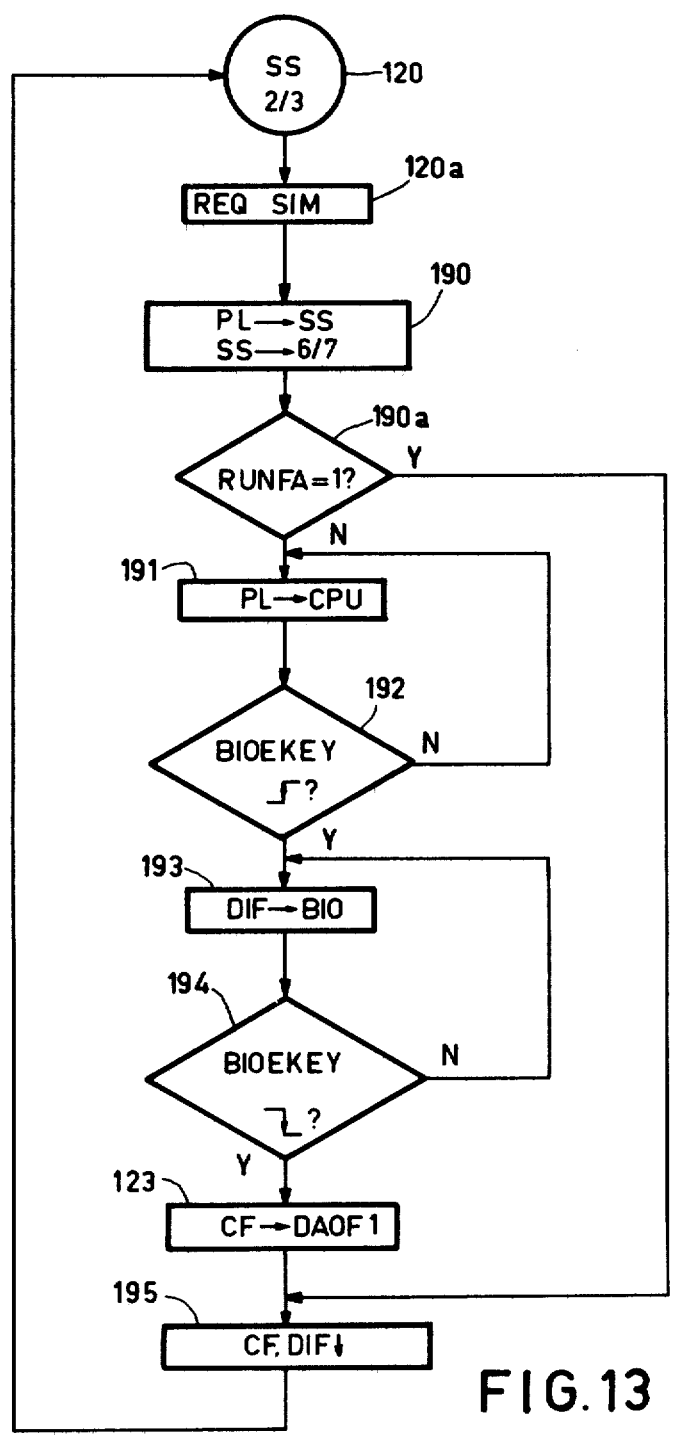

FIG. 13 is the flow chart of the simulation of the command PL. The SS 34 is in the STATE 2 or 3, block 120. When the signal REQSIM is activated, block 120a, the command PL is presented to the SS 34 which proceeds to the STATE 6 or 7, block 190. If the flipflop RUNFA is set to 1 (test 190a), this command is not executed, a jump being made directly to the block 195 where the FIFOs CF and DIF are shifted in order to simulate the next command. If RUNFA is reset to 0, the command is applied to the CPU 10, block 191. The CPU 10 analyzes the command and activates the signal BIOEKEY. The SS 34 tests the state of the signal BIOEKEY in the test 192 and if it is not activated, a jump is made to the block 191 in order to save the data on the SB 14 without modification. When BIOEKEY is activated, the data D0, D1 which defines the initial program loader is transmitted on the lines BIO, via the output gates 95, activated by BIOEKEY, block 193. The signal BIOEKEY is tested again during the test 194, and if it is not activated, a jump is made to the block 193 in order to maintain the data on the lines BIO without modification. If BIOEKEY is activated, the sequence 123 is executed. The CF 33 and the DIF1, 31, and DIF2, 32, are shifted, block 195, the SS 34 proceeding to the STATE 2 or 3.

Figure 14:
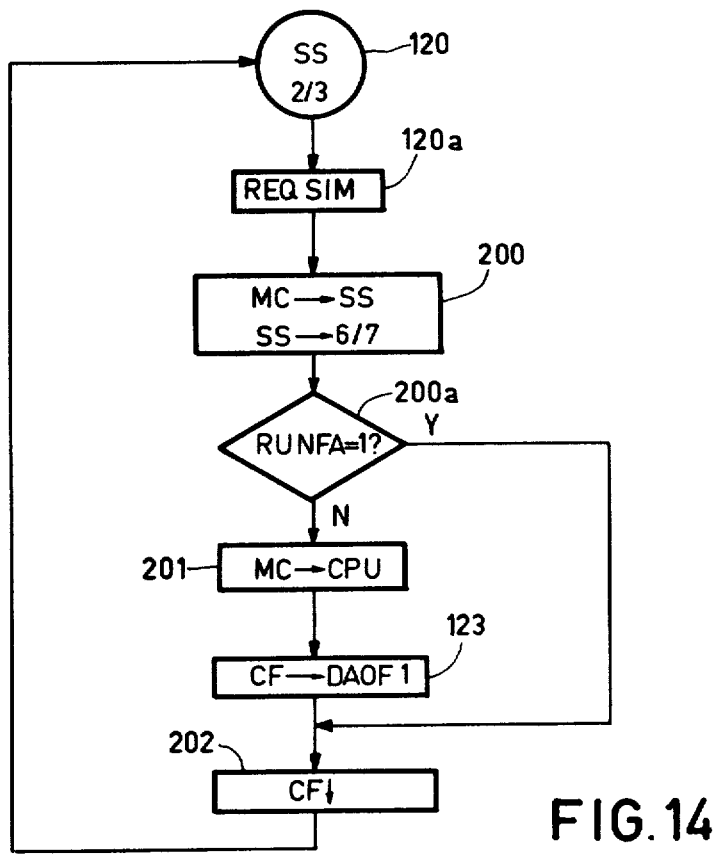

FIG. 14 is the flow chart of the simulation of the command MCLEAR (MC). The SS 34 is in the STATE 2 or 3, block 120. When the signal REQSIM is activated, block 120a, the command MC is presented to the SS 34 which proceeds to the STATE 6 or 7, block 200. If the flipflop RUNFA is set to 1 during the test 200a, this command is not executed, a jump being made to the block 202 in order to shift the FIFOs for simulating the next command. If RUNFA is reset to 0, the command is applied to the CPU 10, block 201. The CPU 10 executes this command for resetting all appropriate elements to 0, such as the counters, the status flipflops, etc. It is to be understood that normally this command is programmed only if a command such as READ THE STATUS WORD allows detection that the CPU 10 has indeed been stopped. The sequence 123 is then executed, the CF 33 is shifted and the SS 34 proceeds to the STATE 2 or 3, sequence 202 in FIG. 14. The state of the signal RUNFA in the SS 34 ensures that this command (like the command IPL) is not executed when the CPU 10 is active.

Figure 15:
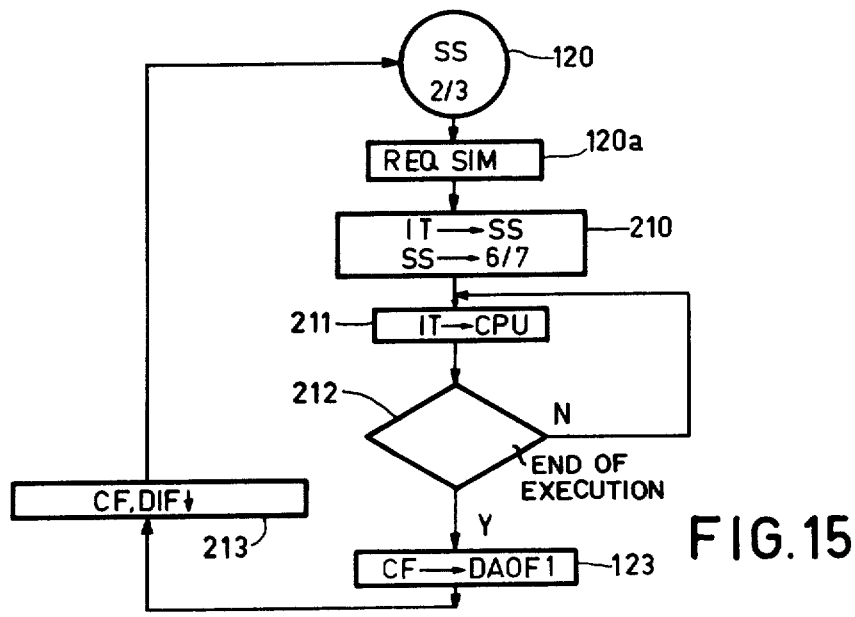

FIG. 15 is the flow chart of the simulation of the command CPINT (IT). The SS 34 is in the STATE 2 or 3, block 120. When the signal REQSIM is received, block 120a, the command IT is presented to the SS 34 which proceeds to the STATE 6 or 7, the command being at the same time applied to the CPU 10, sequences 210 and 211 in FIG. 15. The signal indicating the end of the execution is tested during the test 212, a jump being made to the block 211 in order to ensure that the command is maintained on the SB 14 if EOE is not activated. When EOE is activated, the sequence 123 is executed and the CF 33 is shifted (sequence 213), the SS 34 proceeding again to the STATE 2 or 3.

The command STOP AT A PREDETERMINED ADDRESS (PREQN) is simulated in a manner other than the other commands described. With reference to the CAM 35 (FIG. 2) and the definition of the command PREQN, the parameters and the appropriate address are loaded into the CAM 35, the signal MATCH being utilized by the SS 34 for stopping the CPU 10 at the predetermined address, the address of the relevant memory location being despatched to the line 19. With reference to FIG. 3 with PREQN active, the SS 34 changes over between the STATES 3, 4, 5 and 6, represented by 72, 75, 74 and 76, respectively, while if PREQN is inactive, the SS 34 changes over between the STATES 1, 2 and 7, represented by 70, 71 and 73, respectively.

The simulation of the command DUMP MEMORY (DT) is not directly tested by the SS 34, but by the DMA 36 as described with reference to FIG. 2. Its simulation will be described with reference to the flow chart of FIG. 16 and the diagram of FIG. 2.

Figure 16:
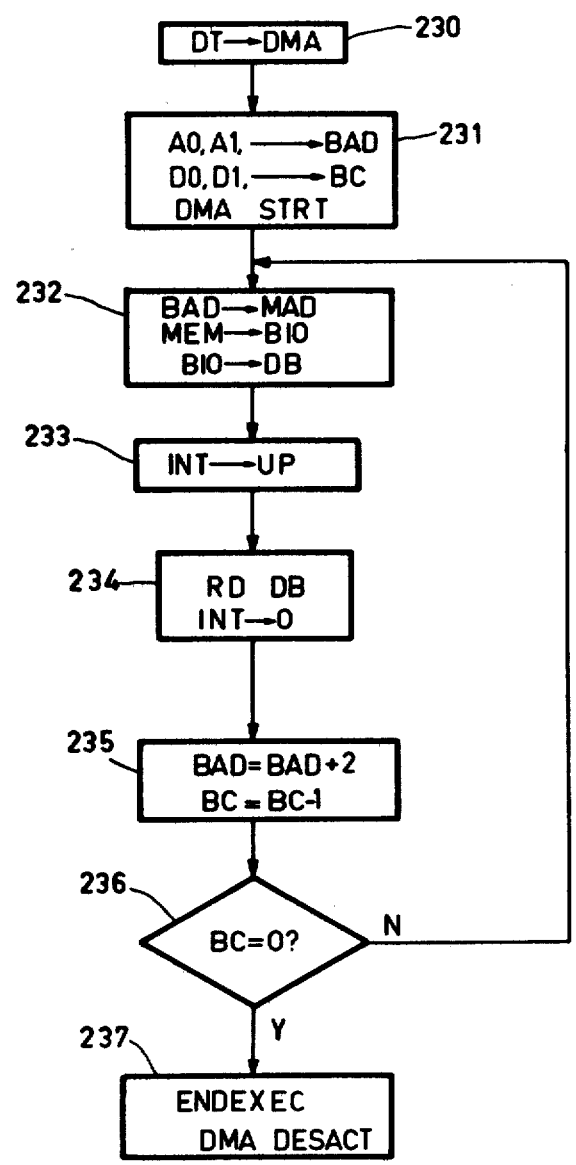

After the decoding by the microprocessor 40, the command DT is not loaded into the SS 34 but is directly applied to the DMA 36 via the busses 62 and 56, block 230 in FIG. 16. The DMA 36 is microprogrammed for executing this specific command and for controlling the transmission of the data between the memory 11 and the microprocessor 40. The DMA 36 comprises three registers of 16 bits each: an address buffer register (BAD) which defines the first address of the data block to be transferred, a length buffer register (BC) which defines the length of the block of data, and a data buffer register (DB) which stores the data in transit. After the transmission of the command, the microprocessor 40 transmits the first address A0, A1 on the bus 56, this address being loaded into the register BC. When the command is received, followed by the parameters, the DMA 36 commences the execution of the command, these sequences being denoted by the reference 231 in FIG. 16. The first address of the memory 11 is transmitted on the lines MAD (content of the register BAD), via the bus 51 and the interface 22a, the content of the memory 11 being loaded on the lines BIO and this information being loaded in the register DB, via the interface 22b and the bus 64; these sequences are denoted as 232.

The DMA subsequently applies the interrupt DMA to the microprocessor 40, block 233. The microprocessor utilizes two input/output instructions (I/O) for reading the word of the register DB, via the bus 56, because this is an 8-bit system, and it resets the interrupt DMA to 0 after the first instruction I/O, block 234. When the microprocessor 40 has read the data, the register BAD is incremented by 2 and the register BC is decremented by 1, block 235 in FIG. 16. The length of the block, that is to say the content of the register BC, is tested in order to determine whether or not the length of the block is zero, sequence 236. If the length is not zero, the transmission is not complete and a jump is made to the sequence 232 in order to reach the word of the next address. If the content of the register BC is zero, the transmission of the block is terminated and a signal indicating the end of the execution is sent to the microprocessor 40 on the bus 56, after which the DMA is deactivated, sequence 237.

The procedure used by the microprocessor 40 for exchanging the data with the UART 37 and ultimately with the line 19 will be described at a later stage.

The command decoding test sequence (CDCS) for decoding the simulation commands will yet be described with reference to the functional diagram of FIG. 2 and the detailed flow charts of the FIGS. 17 and 18.

With reference to FIG. 2, a command transmitted by the CPCS 21 is received by the UART 37 as a sequence of characters at the speed of the line. When the UART 37 has received a character, it activates the interrupt INCHR which is applied to the microprocessor 40, via the interrupt system 43. Consequently, the microprocessor selects the address of the UART and emits an instruction LECTURE (RDA) on the bus 62, which controls the reading of the character in the UART 37, on the bus 56, and its loading into an internal register of the microprocessor for analysis. The subsequent characters in a sequence of commands are treated in the same manner, i.e. the UART 37 interrupts the microprocessor 40 for each character received and the microprocessor 40 subsequently reads the appropriate character via an instruction RDA.

The test and decoding program is stored in the memory PROM 41 of the microprocessor which analyses and decodes each command received in a specific decoding sequence. This CDCS is shown in the flow charts 17 and 18.

The first command tests is UNLOCK; if the sequence of the command characters does not decode UNLOCK, the command LOCK is tested. If will be clear that the SS 34 must be either in the state LOCK or in the state UNLOCK, that is to say in the STATES 1-4 or the STATES 2-3 (FIG. 3). When the SU 12 is first started, a master reset-to-0 positions the SS 34 in the state LOCK, so in the absence of an explicit command UNLOCK from the CPCS 21, the SS 34 will remain in the state LOCK. Normally, at the start of a command sequence the command LOCK or UNLOCK is explicitly programmed. Thus, the CDCS first of all tests the commands UNLOCK and LOCK, and subsequently the other commands in the relevant sequence, described with reference to the FIGS. 17 and 18.

After the complete decoding of a command, the microprocessor 40 loads, via the instructions I/O, the decoded command and the address parameters in the CF 33, the AIF1, 29, and AIF2, 30, and the data in the DIF1, 31, and DIF2, 32. The loading is realized via the command and address bus 62 and the data bus 56. The SS 34 either simulates the command immediately if it is in the state UNLOCK, or does not simulate it when it is in the state LOCK.

Figure 17:
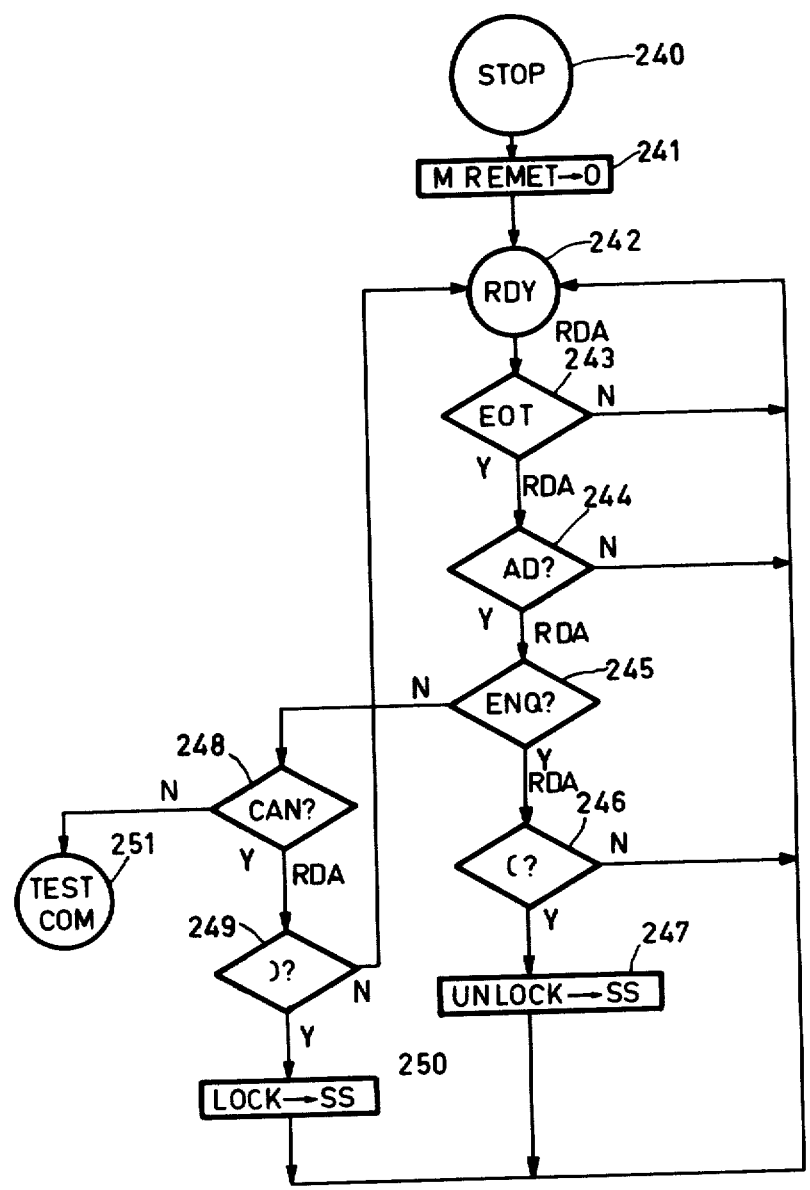
FIGS. 17 and 18 are flow charts showing the test sequences for decoding the commands defined by the present invention.

The flow chart of FIG. 17 describes the CDCS of the commands UNLOCK and LOCK. Initially, the state of the CDCS is STOP (block 240); when a reset to 0 signal MREMET (241) is received at the instant of the first start, the state of the CDCS changes to state READY (block 242). In this state READY, commands can be analyzed and decoded. The microprocessor 40 reads the first character of the command EOT, via an RDA. A test is performed on the character EOT during the test 243 and, if it is correct, a further test is performed on the two address characters (AD) uduring the test 244 via two instructions RDA. If EOT is not correct, the CDCS jumps to the state READY where the analysis recommences. If the address AD is not correct, a jump is again made to the state READY. If the address is correct, a test 245 is performed for the first character which defines the command (CDC), which is ENQ in this case. If the test 245 is correct, a test 246 is performed on the second CDC which is (. If ( is decoded, the command UNLOCK is decoded, a signal UNLOCK is transmitted to the SS 34, block 247, and the SS 34 proceeds to the STATE 2, so all other decoded commands are immediately simulated. If the character tested during the test 246 is not (, the CDCS again jumps to the state READY. After the decoding and the transmission of the command UNLOCK, block 247, the CDCS jumps to the state READY, where the next commands are decoded in the state UNLOCK.

If the first CDC is not ENQ during the test 235, the test 248 is performed on the first CDC, CAN, of the command LOCK. If the first CDC is CAN, the test 249 is performed on the second CDC, ) of the command LOCK. If this is not ), the CDCS jumps to the state READY but if it is ), the command lock is decoded, the signal LOCK is despatched to the SS 34, block 250, and the SS 34 proceeds to the STATE 1. In this state, all commands received are decoded and loaded into the CF 33 for ultimate simulation, that is to say when the command UNLOCKED is received. After the decoding and the transmission of LOCK, block 250, the CDCS jumps to the state READY where the next commands are decoded in the state LOCK. If neither UNLOCK nor LOCK is decoded, the SS 34 is implicitly in the state LOCK.

If the first CDC, CAN, is not decoded during the test 248, other codes may be tested in a specific sequence, as indicated by the TEST COM., denoted by 251. The second CDC is read via an RDA, after the first CDC has been decoded, for a test of the specific command. If the first CDC does not correspond to the code of the tested command, testing of the next code is attempted by using the same CDC. Thus, if ENQ is not decoded during the test 245, CAN is tested during 248; if CAN is not decoded, the next command in the sequence of the CDCS is tested, via the block 251, etc. If the second CDC of the command tested is not decoded, the CDCS always jumps to the state PRET where the analysis recommences for the next command received. The command which is not decoded is thus incorrect and is not simulated. The CPDS 21 can thus detect a non-decoded and non-simulated command in a sequence of specific commands, because it receives neither the results nor the return command on the line. If there is no response at all during a given period of time in a sequence of commands, the CPCS 21 triggers a test sequence in order to make a diagnosis. This predetermined period of time may be given by a control clock.

Figure 18:
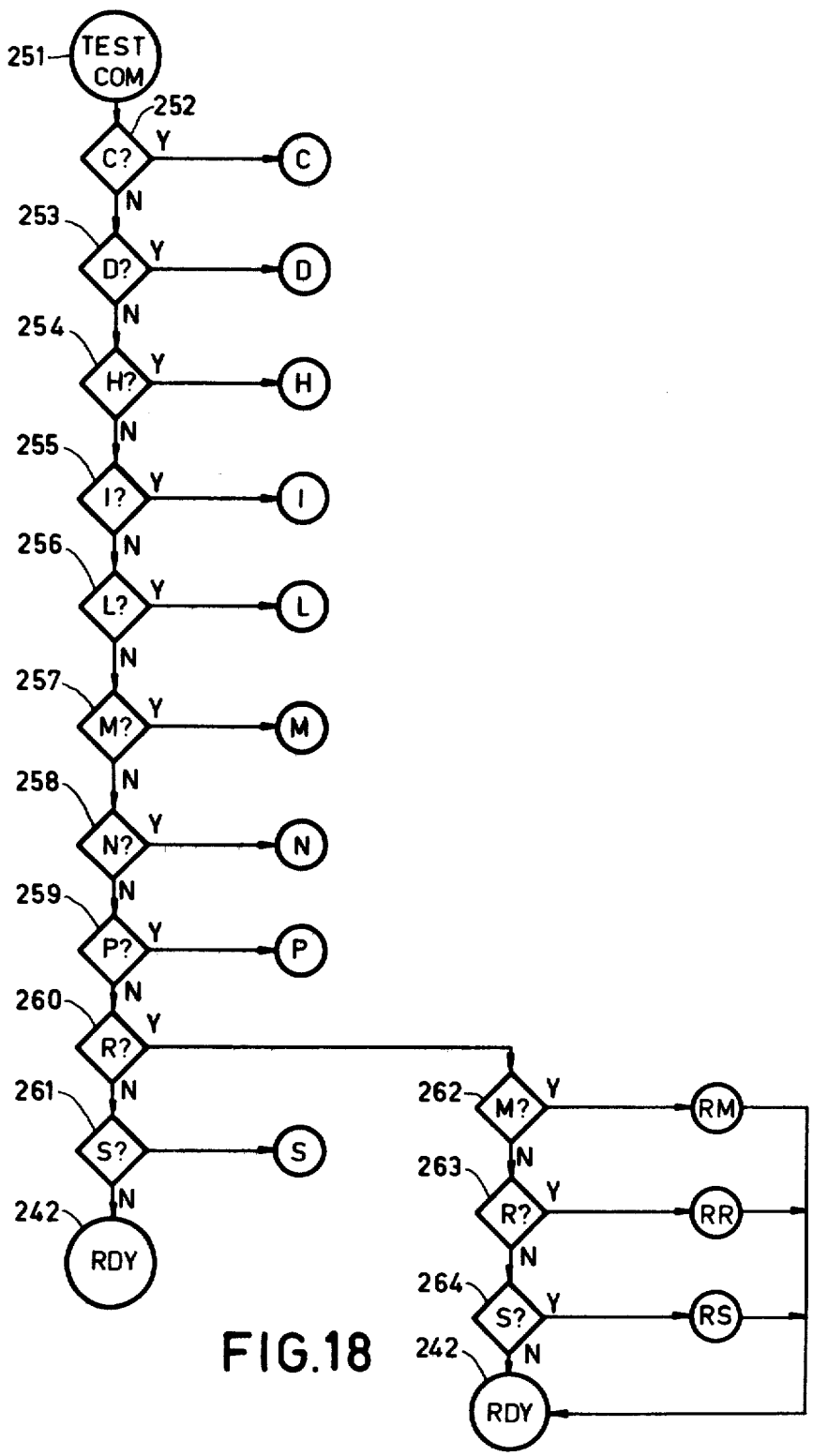

The flow chart of FIG. 18 shows the CDCS for all other commands defined according to the present invention. The state TEST COM. enables the decoding of other programmed commands in said sequence. The tests 252 to 261 represent the sequence of the command codes with which the first CDC is compared until the occurrence of correspondence therebetween. This test sequence is: LOAD THE REGISTER, test 252, DUMP MEMORY, test 253, STOP AT A PREDETERMINED ADDRESS, test 254, CP INTERRUPT, test 255, LOAD THE MEMORY, test 256, MCLEAR, test 257, INSTRUCTION, test 258, IPL, test 259, and RUN, tests 260 and 261.

If the first CDC tested is not the first command character for one of the codes defined above, the CDCS jumps to the state READY where the analysis recommences. If the first CDC is decoded in the test sequence 252 to 259, the CDCS jumps to the command test sequence (CCS) corresponding to the relevant command. These CCS are C, D, H, I, L, M, N, P and S in the flow chart 18, and will be described with reference to their specific flow chart.

If the first CDC decoded during the test 260 is R, the second CDC is read, via an RDA. If this second CDC decoded is M (test 262), the CDCS jumps to the CCS READ THE MEMORY (RM). If this second CDC is not M (test 262), the test 263 tests R. If R is decoded, the CDCS jumps to the CCS READ THE REGISTER (RR); if not, the second CDC is tested again during the test 264. If it is decoded, like S in the test 264, the CDCS jumps to the CCS READ THE STATUS WORD (RS); if not, the command cannot be decoded and, consequently, the CDCS jumps to the state PRET, the command is not simulated and the analysis of the next command may commence.

The overall testing by the microprocessor 40 of each CCS will be described with reference to the flow charts of the FIGS. 20 to 30, the functional diagrams of the FIGS. 2 and 5, and the output test sequence (OCS) of FIG. 19.

Figure 19:
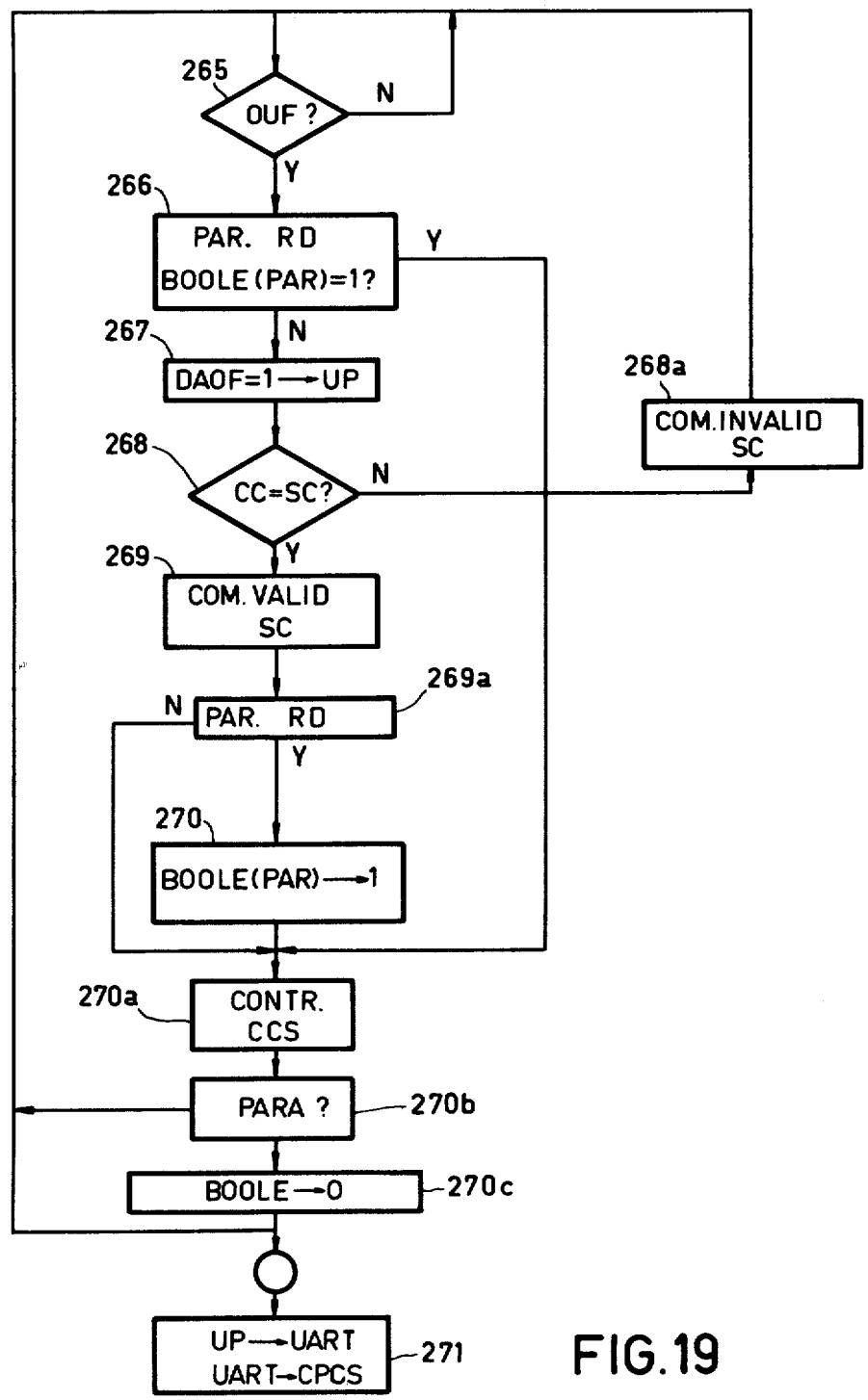
FIG. 19 is a flow chart describing the output test sequence used for testing the transmission of the results of the executed commands.

FIG. 19 is the flow chart of the OCS used by the microprocessor 40 for testing the output to the CPCS 21 of the results of the commands executed by the CPU 10. The OCS is stored in the PROM section and utilizes lists of commands stored in the RAM section of the memory 41. The microprocessor 40 awaits the interrupt OUF during the test 265. OUF is activated when the command code (CC) has been loaded into the DAOF1, 27, by the SS 34; this indicates that the simulation of the command has been performed. When OUF is activated, the microprocessor 40 tests the boolean PAR in order to determine whether there are parameters to be read (test 266). After the simulation and the execution of a command, when OUF is activated the first time, the boolean PAR is always reset to 0. Thus, the content of the DAOF1, 27, is subsequently read by the microprocessor (block 267), the microprocessor 40 stores the list of commands for simulation in the section RAM 41, and the commands are simulated and executed in the order of reception. Therefore, during the test 268, the microprocessor 40 compares the CC read with the stored command (SC) at the top of its list. If CC=SC, the command executed is valid and SC is removed from the list (block 269). Because the number of relevant parameters is also stored in the DAOF1, 27, the microprocessor 40 can analyze whether there are parameters to be transmitted with the results of the execution of the command (test 269a); if there are parameters to be read, the boolean PAR is set to 1 (block 270) and the testing is surrendered to the appropriate command test sequence (CCS) which is activated (block 270a). Each CCS comprises an output execution subsequence (ES) which reads the relevant parameters of the FIFOs DAOF1, 27, and DAOF2, 28, and stores these parameters in the RAM 41 for ultimate transmission to the CPCS 21. The CCS, after each reading of the FIFOs 27 and 28, performs a test in order to determine if all parameters have been read (test 270b). After termination of this read operation, the boolean PAR is reset to 0, testing is surrendered to the OCS and the ES of the CCS is deactivated (block 270c). The subsequence of the OCS which tests the FIFOs 27 and 28 is terminated and a jump is made to the test of OUF. The OCS transmits the parameters and the command characters to the UART 37 via the appropriate interrupts as already described. In its turn, the UART 37 transmits this information to the CPCS 21 (block 271).

If parameters remain to be read during the test 270b, a jump is made to the block 265. The reading of each word of the FIFOs 27 and 28 automatically resets the interrupt OUF to 0 and as soon as a FIFO contains information for the microprocessor, the interrupt OUF is activated. If the boolean PAR is set to 1 during the test 266, a jump is directly made to the block 270a, that is to say when it is necessary to read the parameters, the CCS tests the sequence. If a jump is made to the block 268a during the test 268, CC≠SC, i.e. there is an error in the execution of the command so the command is invalid, the SC is removed and a jump is made to the state of OUF. The fact that no acknowledgement of this command is despatched to the CPCS 21 triggers a diagnostic sequence by the CPCS 21.

Figure 20:
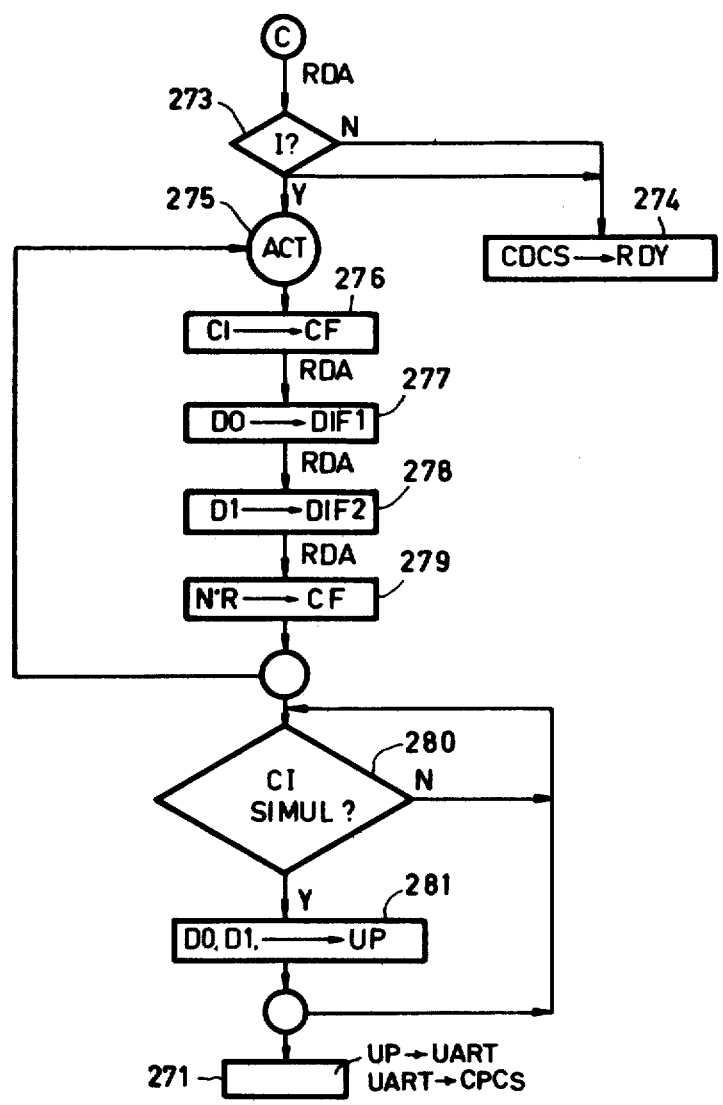

FIG. 20 is the flow chart of the CCS LOAD THE REGISTER. Generally, each CCS comprises two subsequences which are asynchronous. The first subsequence (SS), the loading of the command, performs the decoding and the loading of the command and the parameters in the various FIFOs. The second SS, output execution (ES), is used with the OCS in order to load the results of an executed command into the RAM 41. If the first CDC is decoded as C (FIG. 18), a jump is made to C of FIG. 20. After an RDA, the second CDC is tested during the test 273; the CDCS performs a jump to the state READY if this CDC is not 1. If the CDC is 1, the command LOAD THE REGISTER is decoded, the CDCS again jumping to the state PRET (block 274).

The CCS LOAD THE REGISTER which is in the state ACT (active), block 275), then tests. Under the command of the CCS, the code of the command (4 bits) is applied to the CF 33 via the bus 56, by way of an instruction I/O of the microprocessor 40, on the bus 62 (sequence 276). The parameters D0, D1 and NR (received via the RDAs) are loaded into the DIF1, 31, DIF2, 32, and CF 33. These sequences are represented by 277, 278 and 279. The character NR, which defines one of the 16 registers of the CPU 10, is coded in 4 bits loaded in the memory location of the CF 33 which follows the command itself. The SS which tests the loading of the command then jumps to the state ACT, block 275, which is the state in which it can load other commands. The simulation of the command by the SS 34 and its execution by the CPU 10 are realized as described with reference to FIG. 6.

After the execution of the command by the CPU 10, the ES surrenders the testing to the OCS, as denoted by 280, where the simulation is awaited. This ES reads the parameters D0, D1 of the DAOF1, 27, and DAFO2, 28, via the instructions I/O of the microprocessor 40, and loads these parameters into the RAM 41, the ES then jumping to a state where it awaits the simulation, sequence 281. As already described, the OCS transmits these results to the CPCS 21 at the line speed.

The OCS surrenders the testing to the ES corresponding to the executed command. The various test sequences can be performed asynchronously and simultaneously. Thus, the CDCS can decode a command received from the CPCS 21, a CCS can load an already decoded command, the SS 34 can simulate a loaded command, an other CCS (via its ES) can load the results of a command already executed into the RAM 41, the OCS can despatch the results of another executed command to the UART 37 which can transmit these results to the CPCS 21, all these procedures taking place simultaneously. The various sequences are correctly tested by their appropriate interrupt and by their interdependence in the time. The buffering of the data supplied by the FIFOs enables a DPU 20 to operate without delaying a CPU 10 or an SU 12, particularly in a sequence "LOCK, ... commands, ... UNLOCK". The SU 12 and the CPU 10 can simulate and execute, respectively, the commands at a speed which is much higher than the speed at which the commands are received, decoded and transmitted. Thus, the buffering of the results of an executed command in the DAOF 27 and 28 enables the CPU 10, for example, to continue its own program after having executed a simulation request instead of waiting for the direct reading of the results of the lines MAD and BIO.

FIG. 21 is the flow chart of the CCS LOAD THE MEMORY. The second CDC is tested during the test 282 after an RDA. If this is not M, and CDCS jumps to the state READY, block 274; if it is M, the command LOAD THE MEMORY is decoded and the CDCS jumps again to the state PRET. In the state ACT, the CCS despatches the code LM to the CF 33, the data D0, D1 to the DIF1, 31 and DIF2, 32, and the address A0, A1 to the AIF1, 29, and AIF2, 30, these sequences being represented by 283 to 287. The ES awaits the simulation of the command, test 288, which is realized as described with reference to FIG. 7. The ES loads the data D0, D1, into the RAM 41, sequence 299, and jumps to the state "await simulation". The results are transmitted to the CPCS 21 in the described manner, FIG. 22 is the flow chart of the CCS READ THE REGISTER. This command having already been decoded (FIG. 18), the code RR and the number of the register NR are loaded into the CF 33, sequences 291 and 292. When the simulation and the execution of the command have been performed as described with reference to FIG. 8 (test 293), the ES loads the data D0, D1 (content of the register) into the RAM 41 (sequence 294, and jumps to the state "await simulation". The results are transmitted to the CPCS 21 in the described manner.

Figure 23:
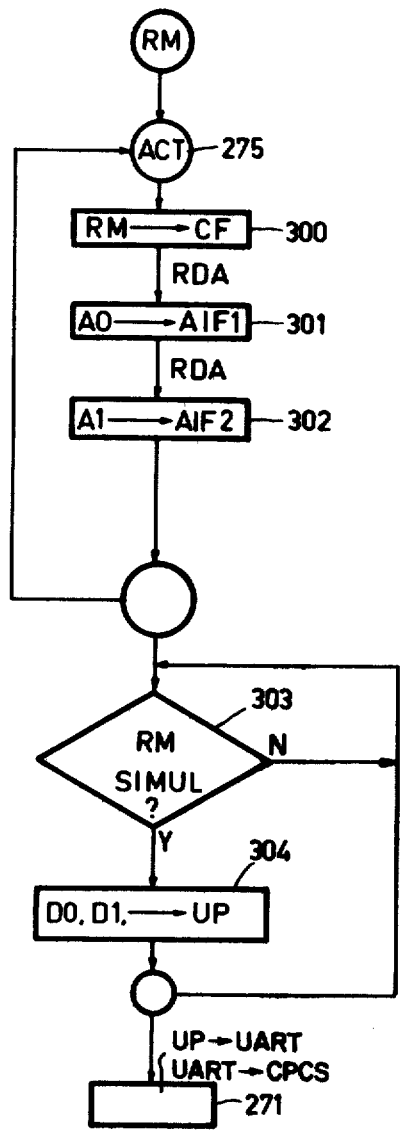

FIG. 23 is the flow chart of the CCS READ THE MEMORY. The command already having been decoded (FIG. 18), the code is loaded into the CF 33 and the address A0, A1 into the AIF1, 29, and AIF2, 30, under test by the SS for loading the command (sequences 300 to 302). The ES awaits the simulation and the execution of the command which are realized as described with reference to FIG. 9 (test 303). The content D0, D1 of the relevant memory location are loaded into the RAM 41, sequence 304, and the results are transmitted to the CPCS 21.

Figure 24:
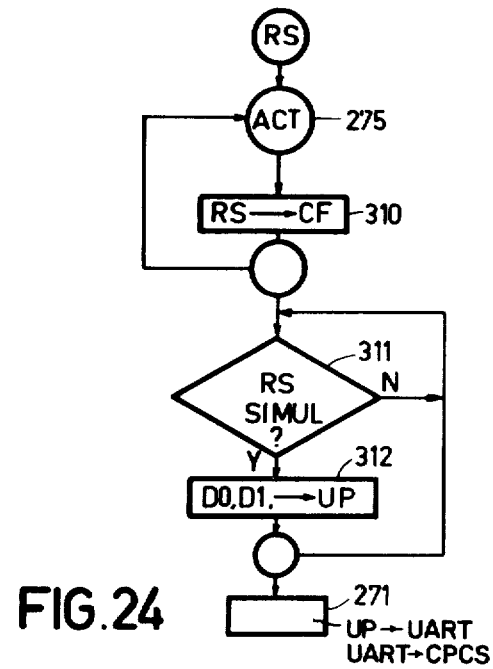

FIG. 24 is the flow chart of the CCS READ THE STATUS WORD. The already decoded command (FIG. 18) is loaded into the CF 33, sequence 310. The simulation and execution of the command, as already described with reference to FIG. 10, are tested during the test 311, the data D0, D1 (status word of the CPU) being loaded into the RAM 41, sequence 312. The transmission to CPCS 21 is realized in the described manner.

FIG. 25 is the flow chart of the CCS RUN. The second CDC of the partly decoded command (FIG. 18) is tested during the test 320. If it is decoded as the R, the command is decoded and loaded into the CF 33, sequence 321. The simulation and the execution of the command RUN, as described with reference to the FIG. 11, are tested during the test 322.

FIG. 26 is the flow chart of the CCS INSTRUCTION. During the test 330, the second CDC of the partly decoded command is tested. If it is T, the CCS is activated and loads the code NT into the CF 33, block 331, the CDCS jumping to the state READY (block 274). The simulation of the command is tested during the test 332 as described with reference to FIG. 12. Subsequently, the address A0, A1 of the next instruction is loaded into the RAM 41, sequence 333, and the results are transmitted to the CPCS 21 in the described manner.

Figure 27:
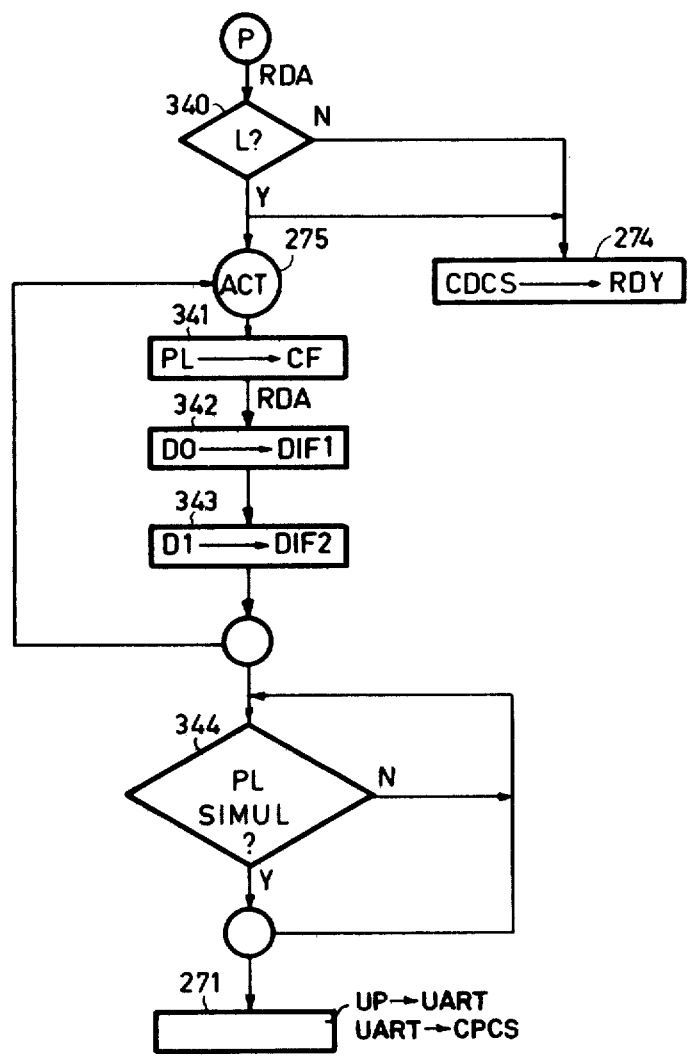

FIG. 27 is the flow chart of the CCS IPL. During the test 340, the second CDC of the partly decoded command is tested. If it is L, the CCS is activated and loads the code PL into the CF 33 (block 341), the CDCS jumping to the state READY (block 274). The parameters D0, D1 are loaded into the FIFOs DIF1, 31, and DIF2, 32, as shown in the blocks 342 and 343. The simulation of the command is tested during the test 344 as described with reference to FIG. 13. Actually, the CCS merely awaits the end of the simulation and passes the testing to the OCS as described with reference to FIG. 19. The OCS transmits the command characters to the CPCS 21.

Figures 28, 29:
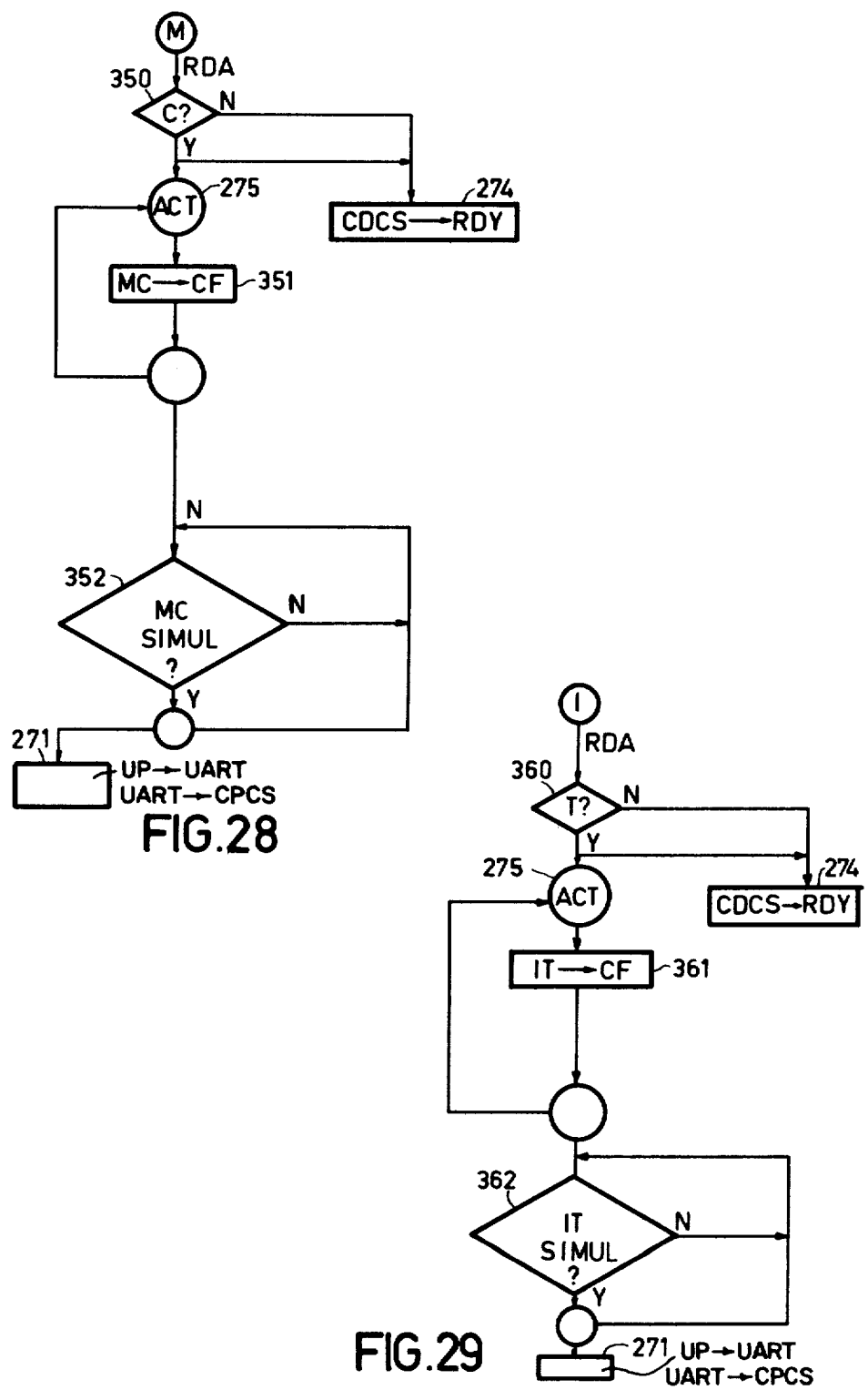

FIG. 28 is the flow chart of the CCS MCLEAR. During the test 350, the second CDC of the partly decoded command (FIG. 18) is tested. If it is (, the CCS is activated and loads the code MC into the CF 33 (sequence 351). The CDCS jumps to the state READY (block 274) in all cases. The SS for loading the command jumps to the state ACT, and the ES performs a test. This ES awaits the end of the simulation of the command during the test 352, the simulation being realized as described with reference to FIG. 14. The results are transmitted to the CPCS 21 in the described manner. A further command such as READ THE STATUS WORD is normally programmed before a command MCLEAR in order to ensure that the CPU is stopped. If a command MCLEAR is directly programmed, and if the flipflop RUNFA is set to 1, the command is not executed by the CPU 10 and the CPCS 21 is warned by an alarm originating from the control clock.

FIG. 29 is the flow chart of the CCS CP INTERRUPT. During the test 360, the second CDC of the partly decoded command of FIG. 18 is tested. It it is T, the CCS is activated and loads the code IT into the CF 33 (blocked 361), the CDCS jumping to the state READY in the described manner. The simulation and the execution of the command are tested during the test 362. When the results are available, the OCS transmits only the characters of the command to the CPCS 21.

Figure 30:
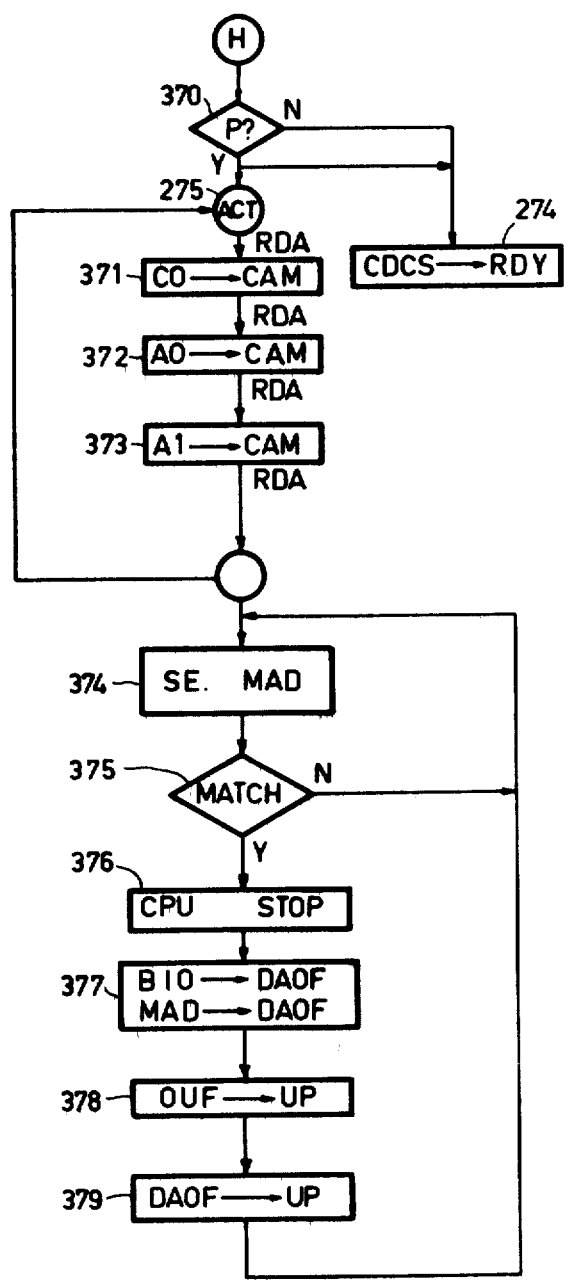

FIG. 30 is the flow chart of the CCS STOP AT A PREDETERMINED ADDRESS. The execution of this CCS differs from that of the other CCS already described. During the test 370, the second CDC of the partly decoded command (FIG. 18) is tested. If it is decoded as P, the SS for loading the command is activated and loads the CAM 35 with the parameters Co and the address A0, A1, via the command bus 62 and the data bus 56, these sequences being represented by 371 to 373. The loading SS jumps to the state ACT, and the CDCS to the state READY.

The predetermined addresses loaded into the CAM 35 (with PREQN active) initiate the monitoring of the lines MAD on the input of the CAM 35, via the bus 53, each time when the CPU 10 executes an instruction of its current program (sequence 374). If the signal MATCH of the CAM 35 is activated, test 375, the coincidence between the predetermined address and an address concerning the instruction currently being executed by the CPU 10 is obtained for the type of access defined by the Co (READ/WRITE, READ only, WRITE only). The activated signal MATCH informs the SS 34 to apply a command STOP (PREQN) to the CPU 10 as defined on the SB 14, sequence 376. The SS 34 defines the correct output on the decoding interface 94, via the signal DECODE. The CPU 10 recognizes this command by loading this command onto the lines BIO which, in their turn, load the DAOF1, 27, and DAOF2, 28. Subsequently, the address of the memory location is loaded into the DAOF1, 27, and DAOF2, 28, via the lines MAD. These sequences, represented by 377 in FIG. 30, are controlled by the SS 34 via the multiplexers 25 and 26 and the test signal SHDAOF.

The loading of the code PREQN into the DAOF1, 27, activates the interrupt OUF to the microprocessor 40, sequence 378, which in its turn activates the OCS for analyzing the interrupt. Consequently, testing is transferred to the appropriate CCS which loads the address into the RAM 41 as denoted by 379. The transmission of the results to the CPCS 21 is realized in the described manner.

It is to be understood that the various DPU 20 connected to the same CPCS 21 may have different sets of commands. The memory 41 has a capacity which suffices for storing the supplementary codes. These supplementary codes may be added to the CDCS for new commands. However, the codes may be modified if the new commands differ only slightly from the commands already defined. Similarly, the supplementary CCS may be programmed and the OCS may be modified for testing the new commands. The microprogrammable SS 34 must also be modified for simulating these new commands, and the decoding on the SB 14 must be modified. The capacity of the various FIFOs may be increased, if necessary. Thus, it is only necessary to modify or replace the microprogrammed and programmed modules, whilst the lay-out and the material design, such as the data busses, the control busses and the address busses, and also the connections between the elements, are maintained without modification. Consequently, the definition of the supplementary commands is flexible and easy from a practical point of view.

APPENDIX (a) Simulation bus

| DESIGNATION | ORIGIN | DESTINATION | FUNCTIONS |
|---|---|---|---|
| BIOEKEY | SPU | SU | data recognition on the bus |
| CPINT | SU | CPU | desk interrupt |
| CPMCN | SU | CPU | reset to 0 |
| INSTN | SU | CPU | instruction by instruction |
| IPL | SU | CPU | load the initial program |
| LMN | SU | CPU | LOAD THE MEMORY |
| LRN | SU | CPU | LOAD THE REGISTER |
| RCP0N | SU | CPU | number of |
| RCP1N | SU | CPU | register |
| RCP2N | SU | CPU | to be loaded |
| RCP3N | SU | CPU | (4 lines) |
| RMN | SU | CPU | READ THE MEMORY |
| RRN | SU | CPU | READ THE REGISTER |
| RSTN | SU | CPU | READ THE STATUS WORD |
| RUNFA | CPU | SU | current state |
| RUNN | SU | CU | progress command |
| START | SU | CPU | |
| PREQN | SU | CPU | STOP AT A PREDETERMINED ADDRESS |

(b) Modem interface

DCTE (Data Transmission Terminal Equipment)
SU/Modem V24/V28 CCITT.

| number of circuit | function of circuit | originating from DCTE | to the DCTE |
|---|---|---|---|
| 101 | mechanical mass | X | X |
| 102 | logic mass | X | X |
| 103 | transmitted data | | X |
| 104 | received data | X | |
| 105 | transmission request | | X |
| 106 | ready for transmission | X | |
| 107 | ready data equipment | X | |
| 108 | connect data equipment to transmission line | | X |
| 109 | line monitoring signal on data receive channel | X | |
| 125 | interrogation indicator | X | |

What is claimed is:

1. A data processing system (DPU) having a plurality of distributed data processing units interconnected to a remote central test and monitor station, said central test and monitor station having sending means for successively sending a first series of specific commands to a distributed data processing unit, each distributed data processing unit having
   (a) a control panel,
   (b) processing means for processing instructions of a standard instruction set,
   (c) a simulation unit having
      (c1) storage means for receiving and storing said first series of specific commands emanated from said central test and monitor station as diagnostic commands, including such diagnostic commands for the diagnostics of the control panel, to be processed in said processing means in lieu of instructions from said standard instruction set,
      (c2) a microprogrammed logic unit interconnecting said storage means and said processing means for decoding each diagnostic command, as a sequence of at least one microinstruction to be stepwise processed in said processing means (CDCS),
      (c3) modifying means connected to said storage means and said microprogrammed logic unit under control of an external signal for modifying the storage content of said storage means and/or a decoding function in said microprogrammed logic unit to effect storing and execution of a second series of specific commands as diagnostic commands, which second series is different from said first series of specific commands,
      (c4) transmitting means for transmitting a processing result of processing a specific command of either said first or said second series to said central test and monitor station,
and wherein said central test and monitor station has furthermore testing and monitoring means for testing and monitoring a processing result received from a distributed data processing unit.

2. A system as claimed in claim 1, wherein said processing means comprise a microprocessor, said storage means comprise a first random access memory, and said logic unit comprises a first programmable read-only memory, for cooperatively decoding a command received while sequentially accessing test sequence elements stored in said programmable read-only memory, said storage means furthermore comprise data storage elements for loading accessed test sequence elements, data elements, addresses and input parameters according to a command test sequence proper to each command, said storage means comprise a second random access memory and said logic unit comprises a second programmable read-only memory in combination with said microprocessor for cooperatively testing the loading in said data storage elements (CCS), analyzing and testing processing results of processing a specific command according to an output test sequence (OCS), and activating said transmitting means for transmitting a processing result to said central test and monitor station, said data storage elements comprise a first FIFO-buffer for said accessed test sequence elements, a second FIFO-buffer for data elements and input parameters, a third FIFO-buffer for address parameters, and a fourth FIFO-buffer for output parameters, outputs of said buffers being connected to said first and second programmable read-only memories and said microprocessor for forwarding thereto an information content to be tested, and wherein said simulation unit furthermore has a state sequencer means having a plurality of programmable-logic-array-induced states for controlling state-by-state the presentation of bit patterns to said processing means and the outputting of processing result bit patterns therefrom to said fourth FIFO-buffer.

3. A system as claimed in claim 2, characterized in that said CDCS first of all tests the programmed commands "LOCK" and "UNLOCK", said status sequencer proceeding to the state "UNLOCK" if the command "UNLOCK" is decoded, all subsequent commands decoded in said state "UNLOCK" being immediately simulated, said status sequencer proceeding to the state "LOCK" if said command "LOCK" is decoded, all subsequent decoded commands in said state "LOCK" being stored, said CDCS performing either a test for other commands if neither the command "UNLOCK" nor the command "LOCK" is at least partly decoded by the first one of the two characters defining the command (CDC), or performing a jump to the state READY if the one or the other of the two commands is decoded, or if a starting character or an address character is incorrect, or if the second one of said CDC of the commands "UNLOCK" or "LOCK" is incorrect, said CDCS recommencing the decoding of the next command received in said state "READY".

4. A system as claimed in claim 3, characterized in that said status sequencer is always in the state "LOCK" if a command "UNLOCK" is not decoded by said CDCS, the simulation of all other decoded commands in this implicit "LOCK" state being postponed until the decoding of a programmed command "UNLOCK".

5. A system as claimed in claim 3, characterized in that said CDCS decodes the other relevant commands according to a specified procedure where said CDC is successively tested for each of said other commands, said CDCS either jumping to the preceding CCS, defined by said first decoded CDC, or successively testing the second CDC for the total decoding of the other commands, as defined by said first decoded CDC, or returning to said state "READY" if said first CDC cannot be decoded, the decoding of the commands recommencing in said state READY.

6. A system as claimed in claim 5, characterized in that said CDCS either jumps to the relevant CCS defined by said second CDC decoded, or returns to the state READY if said second CDC cannot be decoded.

7. A system as claimed in the claim 5 characterized in that said CDCS always returns to the state "READY", either directly after a jump to the CCS defined by said second decoded CDC, or after the testing of said second CDC during a jump to a relevant CCS defined by said first decoded CDC.

8. A system as claimed in the claim 5 characterized in that the decoded CCS stores said decoded commands in said first FIFO, the command and data parameters in said second FIFO, and the address parameters in said third FIFO, said status sequencer directly simulating the commands if it is in the state "UNLOCK".

9. A system as claimed in claim 8, characterized in that the simulation of said decoded commands in said first, second and third FIFO is not performed if said status sequencer is in the state "LOCK", said CCS then jumping to the waiting state "ACT" where they can store the other decoded commands.

10. A system as claimed in claim 9, characterized in that the simulation of said stored commands commences as soon as a command "UN-LOCK" is decoded, said simulation being realized in the order of storage.

11. A system as claimed in claim 2, characterized in that said OCS, in combination with said CCS, tests the correct transmission of the results of the executed commands, said OCS analyzing the executed command, transferring the testing to the correct CCS and testing the transmission of said results, stored by said CCS in said RAM, to the CPCS, said CCS already having loaded said results of said fourth FIFO in said RAM.

12. A system as claimed in claim 11, characterized in that the decoding of commands in said CDCS, said OCS, said CCS and said command simulations take place simultaneously and synchronously, the synchronization being tested by interrupts and interdependent logic states.

13. A system as claimed in claim 12, characterized in that said test means are capable of detecting whether a command has not been correctly executed, said test means erasing the relevant command from the list of commands for execution and inhibiting the transmission of the CDC and the results of said command to the CPCS.

14. A system as claimed in claim 13, characterized in that said test means simulate the commands and transmit the results of their execution to the central test and monitor station (CPCS) in the order in which they have been received from the CPCS.

15. A system as claimed in claim 14, characterized in that said series of commands enables said CPCS to perform diagnostic and test operations on said DPU, said operations involving means for loading and reading the relevant registers, for loading and reading the relevant memory locations, for interrupting current programs, for loading and executing test and diagnosis programs, for executing the current program one instruction after the other, for resetting the correct elements to 0 and for reading the status word of said DPU.

16. A system as claimed in claim 2, characterized in that said system further comprises direct access memory means for transmitting memory blocks from the memory of said DPU to said CPCS, said direct access memory means controlling said transmission of the memory block upon reception of a command.

17. A system as claimed in claim 16, characterized in that said system includes means to modify said specific series of commands in order to define new series of commands by modification of said test sequences stored in said memory PROM and said state sequencer means.

* * * * *